(12) United States Patent
Tertois et al.

(10) Patent No.: US 11,079,509 B1
(45) Date of Patent: Aug. 3, 2021

(54) BUILDING ACCURATE TRAINING IMAGES FOR AUTOMATIC SEISMIC INTERPRETATION

(71) Applicant: Emerson Paradigm Holding LLC, Houston, TX (US)

(72) Inventors: Anne-Laure Tertois, Saint Cyr la Riviere (FR); Jean-Laurent Mallet, Luxembourg-Beggen (LU); Zvi Koren, Ra'anana (IL)

(73) Assignee: EMERSON PARADIGM HOLDING LLC., Houston, TX (US)

( * ) Notice: Subject to any disclaimer, the term of this patent is extended or adjusted under 35 U.S.C. 154(b) by 0 days.

(21) Appl. No.: 17/152,329

(22) Filed: Jan. 19, 2021

(51) Int. Cl.
  *G01V 1/32*  (2006.01)
  *G01V 99/00*  (2009.01)
  (Continued)

(52) U.S. Cl.
  CPC .............. *G01V 1/325* (2013.01); *G01V 1/345* (2013.01); *G01V 99/005* (2013.01);
  (Continued)

(58) Field of Classification Search
  CPC ...... G01V 1/325; G01V 99/005; G01V 1/345; G06K 9/6256; G06N 20/00; G06T 3/003
  See application file for complete search history.

(56) References Cited

U.S. PATENT DOCUMENTS

| 8,504,300 B2 * | 8/2013 | Dorn | G01V 1/32 702/14 |
| 8,600,708 B1 * | 12/2013 | Mallet | G06T 17/05 703/2 |

(Continued)

OTHER PUBLICATIONS

Labrunye et al. „Merging chronostratigraphic modeling and global horizon tracking, seg (Year: 2015).*

(Continued)

*Primary Examiner* — Mohammad K Islam
(74) *Attorney, Agent, or Firm* — Pearl Cohen Zedek Latzer Baratz LLP

(57) ABSTRACT

Automatic propagation of real-world parent seismic images to efficiently generate a collection of realistic synthetic child training images to train a model for accurate automatic seismic interpretation. A 3D structural model in a present-day geological space (e.g., $G_B$) depicting subsurface locations of particles (e.g., in region B) may be transformed by a 3D coordinate space transformation (e.g., $uvt_B$) to a depositional space (e.g., $G^*_B$) depicting past depositional locations of those particles (e.g., corresponding depositional region B). A real-world parent image depicting subsurface locations of particles (e.g., in region A) may be transformed, via a forward transformation (e.g., $uvt_A$), to a depositional seismic image in the depositional space of the three-dimensional structural model (e.g., $G^*_A = G^*_B$). A reverse transformation (e.g., $uut_B^{-1}$) may transform the depositional seismic image from the depositional space into synthetic child training images in the present-day geological space (e.g., $G_B$) for training the model.

30 Claims, 9 Drawing Sheets

(51) Int. Cl.
G06T 3/00 (2006.01)
G06N 20/00 (2019.01)
G06K 9/62 (2006.01)
G01V 1/34 (2006.01)

(52) U.S. Cl.
CPC ........... *G06K 9/6256* (2013.01); *G06N 20/00* (2019.01); *G06T 3/0031* (2013.01)

(56) References Cited

U.S. PATENT DOCUMENTS

| | | | | |
|---|---|---|---|---|
| 8,711,140 | B1* | 4/2014 | Mallet | G01V 99/005 345/419 |
| 8,743,115 | B1* | 6/2014 | Mallet | G06T 3/20 345/424 |
| 10,114,134 | B2* | 10/2018 | Li | G01V 99/005 |
| 10,795,053 | B2* | 10/2020 | Dulac | G01V 99/005 |
| 2013/0204598 | A1* | 8/2013 | Mallet | G01V 1/325 703/6 |
| 2014/0278106 | A1* | 9/2014 | Mallet | G01V 99/005 702/2 |
| 2015/0212231 | A1* | 7/2015 | Borouchaki | G01V 11/00 703/10 |
| 2020/0225383 | A1* | 7/2020 | Mallet | G06T 19/20 |

OTHER PUBLICATIONS

Wu et al. (Building 3D subsurface models conforming to seismic structural and stratigraphic features, 2017). (Year: 2017).*
Patel et al. Illustrative rendering of seismic data (Year: 2007).*
Ernst, Mitigation of Manhole Events Caused by Secondary Cable Failure (Year: 2011).*
Bergen, Karianne J., et al. "Machine learning for data-driven discovery in solid Earth geoscience." *Science* 363.6433 (2019).
Di, Haibin, et al. "Accelerating seismic fault and stratigraphy interpretation with deep CNNs: A case study of the Taranaki Basin, New Zealand." *The Leading Edge* 39.10 (2020): 727-733.
Guo, Bowen, Lu Li, and Yi Luo. "A new method for automatic seisrnic fault detection using convolutional neural network." *SEG Technical Program Expanded Abstracts 2018*. Society of Exploration Geophysicists, 2018. 1951-1955.
Huang, Lei, Xishuang Dong, and T. Edward Clee. "A scalable deep learning platform for identifying geologic features from seismic attributes." *The Leading Edge* 36.3 (2017): 249-256.
Wu, Xinming, et al. "FaultBeg3D: Using synthetic data sets to train an end-to-end convolutional neural network for 3D seismic fault segmentation." *Geophysics* 84.3 (2019): IM35-IM45.
Wu, Xinming, et al. "Building realistic structure models to train convolutional neural networks for seismic structural interpretation." *Geophysics* 85.4 (2020): WA27-WA39.

\* cited by examiner

BUILDING ACCURATE TRAINING IMAGES FOR AUTOMATIC SEISMIC INTERPRETATION

FIELD OF THE INVENTION

Embodiments of the invention relate to seismic interpretation, in which seismic images composed from seismic waves reflected off of interior surfaces and discontinuities within the subsurface of the Earth, are analyzed to derive geological information, such as, faults, horizons and geobody geometry. Geoscientists may use this geological information to characterize the structural and stratigraphic geology of the Earth's subsurface, e.g., for enhancing production in mining, oil and gas, and geothermal industries.

BACKGROUND OF THE INVENTION

Conventional seismic interpretation is performed manually by a geoscientist identifying geological structures. Manual seismic interpretation, however, is labor intensive and prone to human error. Semi-automatic interpretation methods, such as, coherency-driven methods, were derived to address these issues and increase the speed and accuracy of seismic interpretation. These semi automatic interpretation methods though still suffer from the problems of manual intervention.

Accordingly, fully-automated seismic interpretation was developed, for example, using artificial intelligence such as neural networks or other data driven technologies, to extract geological information from seismic images. The quality of automatic interpretation performed, e.g., by neural networks, however depends on the images used in their training poor quality non-realistic images or imprecise or incomplete interpretation labels impair the capacity of these data driven technologies to correctly interpret vast amounts of seismic data. Consequently, building sets of realistic training images is the cornerstone of the automatic interpretation procedure.

Current methods generate artificial training images using mathematical simulations that aim to mimic geological processes. In a typical mathematical simulation, a flat initial image may be deformed to simulate folding and faulting. Random noise may then be added to reproduce the variability and imprecision inherent in seismic data. However, these simulations fall short, as it is almost impossible to reliably simulate the diversity, complexity, and realism of seismic images of the subsurface geology using synthetic images. There are many factors, in addition to the actual geological mechanisms (e.g., compaction, tectonic stress—folding and faulting, weathering, etc.), that affect the signature of seismic images. Real world variability may be caused, for example, by seismic illumination problems due to the limited available seismic acquisition systems, the complexity of the overburden geological layers, and many different random and coherent (e.g., active and passive) types of noise which are not accounted for in these mathematically simulated images.

The accuracy of such automatic seismic interpretation is only as accurate as its training images are realistic. Because many diverse real-world complexities are typically omitted in synthetic training images, models such as neural networks trained by those synthetic images are typically only accurate when interpreting seismic images that sufficiently resemble those artificially images (e.g., containing similar geological features and limited amounts of noise), but fail when interpreting more complex real-world seismic images (e.g., containing dissimilar geological features and real-world noise).

Accordingly, there is a need in the art for diverse, high quality, realistic training images to train artificial intelligence or other data driven technologies to accurately and reliably interpret a more diverse and complex range of real-world seismic images.

SUMMARY OF EMBODIMENTS OF THE INVENTION

Embodiments of the invention provide new techniques to improve the reliability, accuracy and speed of generating training images for automatic seismic interpretation, by using real-world recorded seismic images or data as a "parent" or ancestor seismic image as a seed to proliferate and grow new synthetic "child" or descendant training images. Variations in the parent image emerge as it is transformed from a present-day geological space to a depositional space depicting the past deposition of the layer, and back again.

In an embodiment of the invention, real-world parent seismic images may be automatically propagated to efficiently generate a collection of realistic synthetic child training images to train an artificial intelligence or other data driven model, such as a neural network, for accurate automatic seismic interpretation. A three-dimensional (3D) structural model in a present-day geological space (e.g., $G_B$) depicting subsurface locations of particles (e.g., in region B) may be transformed by a 3D coordinate space transformation (e.g., $uvt_B$) to a depositional space (e.g., $G^*_B$) depicting past depositional locations of those particles (e.g., in the corresponding depositional region B). A real-world parent image depicting subsurface locations of particles (e.g., in region A) may be transformed, via a forward transformation (e.g., $uvt_A$), to a depositional seismic image in the depositional space of the three-dimensional structural model (e.g., $G^*_A = G^*_B$). When the real-world parent image region A is different than the 3D structural model region B (e.g., AB), but the real-world parent image is mapped to the same depositional space as the 3D structural model (e.g., $G^*_A = G^*_B$), the depositional seismic image depicts a hybrid of region A's seismic data and region B's structural objects. A reverse transformation (e.g., reverse-$uvt_B$) may then transform the depositional seismic image from the depositional space into one or more synthetic child training images in the present-day geological space (e.g., $G_B$). The plurality of synthetic child training images may be associated with seismic interpretation training labels, e.g., encoding geological object of interest, geometric labels such as directions, normal and azimuth, geological-time, etc., which are stored.

Propagating real-world recorded parent seismic images to proliferate and grow new synthetic child training images is faster and more efficient than generating new real-world images from scratch, because such embodiments circumvent the complex and time-consuming process of building a structural velocity-depth model and performing seismic imaging to generate new images. Using real-world parent seismic images as the source also generates more realistic synthetic training images (e.g., exhibiting realistic geological complexities and problems such as coherent noise, footprints due to acquisition geometry, illumination issues, etc.) compared to generating synthetic training images using mathematical simulations. Due to its speed and accuracy, this technique generates synthetic training images faster than (or a greater number in a comparable amount of time) new real-world images from scratch, and that are more realistic than new mathematically simulated images, resulting in a significantly larger number of realistic training images, which results in more accurate training of the artificial intelligence or other data driven model.

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

Figure 1:
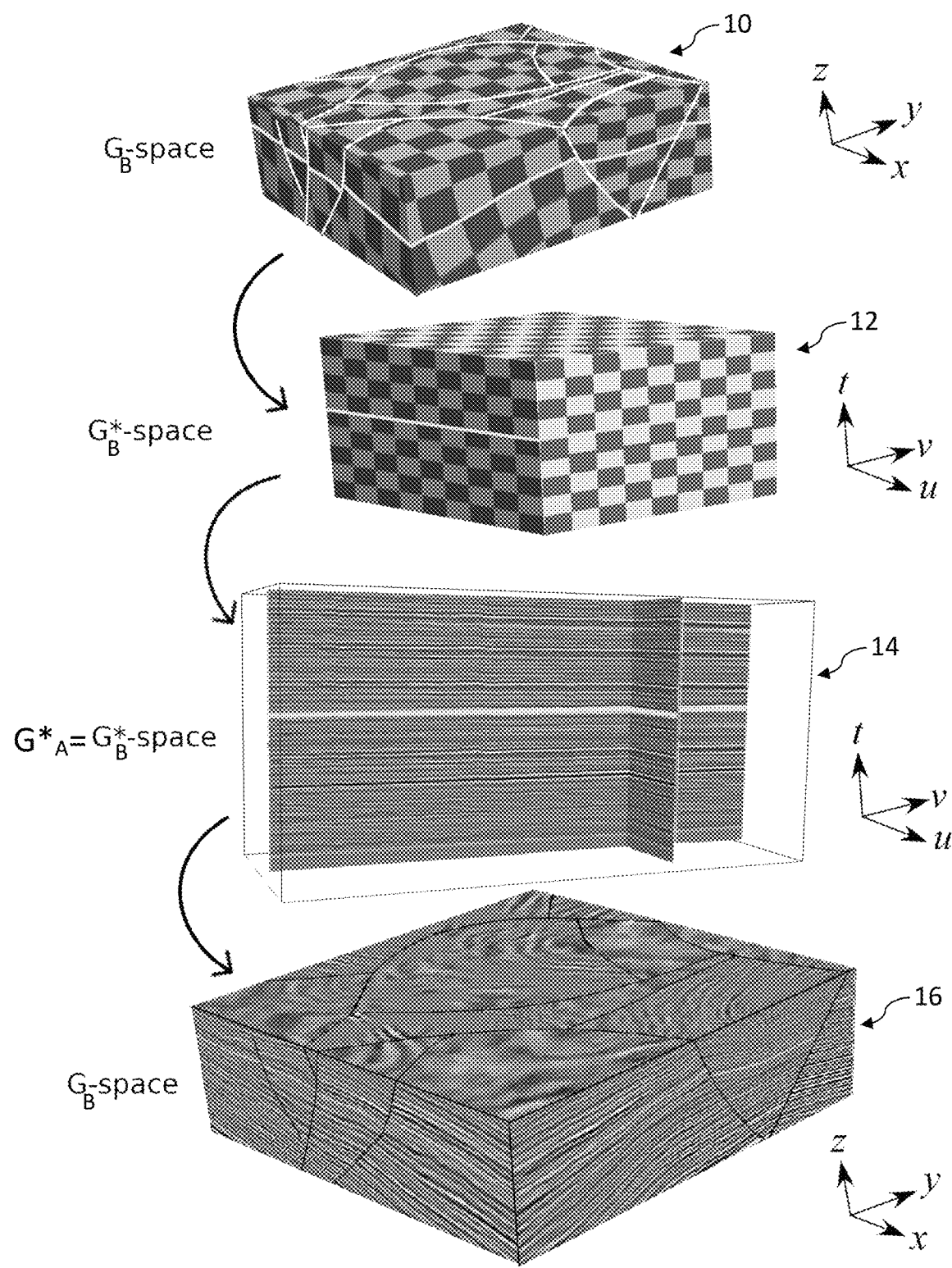
FIG. 1 schematically illustrates data structures for converting a real-world parent seismic image into a synthetic child seismic image, according to some embodiments of the invention. A structural model in the geological space $G_B$, created from interpreting a real-world seismic image in region B, is associated with a depositional space $G^*_B$ via a coordinate transformation. A real-world parent seismic image in region A is then mapped via a forward (uvt$_A$) transformation to the depositional space $G^*_A$ of region A. Region A's depositional space $G^*_A$ may then be equated with region B's depositional space $G^*_B$ to form a new hybrid depositional image mixing geological data from region A (via the parent image) and region B (via the structural model). This hybrid depositional image is then projected back via a reverse-uvt$_B$ transformation into a different geological space $G_B$, to create a synthetic child seismic image in a different region B, and with different geological features, than the original parent image in region A.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF EMBODIMENTS OF THE INVENTION

Embodiments of the invention provide a system, device and method for generating training images for automatic seismic interpretation by inputting a real-world recorded seismic image or data as a "parent" seismic image to proliferate and grow new output synthetic "child" training images. A single real-world parent image may be propagated and proliferated to a create a multiplicity of different synthetic child training images. Each synthetic child image may be a different perturbation or configuration of the real-world parent image and its points or geological objects, such as, different locations in the subsurface, orientations, sizes, combinations of objects, etc. The proliferation process may be repeated for multiple iterations, each iteration creating a new generation of child or descendent images branching from a common parent or ancestral image, e.g., resembling a family tree structure. Each synthetic child image differs from its seed parent image, as well as all (or multiple) other synthetic child images (e.g., stemming from the same and/or different parent images), to create a diverse collection of training images to train an artificial intelligence or other data driven model, such as a neural network.

During training phase, the model may be trained to perform automatic seismic interpretation using the plurality of the synthetic child training images and associated seismic interpretation training labels. During a run-time or prediction phase, the trained model may receive new seismic images and perform automatic seismic interpretation to form new associations with new or pre existing seismic interpretation labels. In some embodiments, the training phase precedes the runtime phase, while in other embodiments, the two phases may be run concurrently, in overlapping, or in alternating time periods, particularly when new images become available to update the model's training.

Embodiments of the invention operate over two coordinate spaces: a present-day geological space (e.g., depicting locations of particles of the subsurface geology of the Earth measured at a current time period) and a depositional coordinate space (e.g., depicting past locations of the particles at times when the particles were determined to be originally deposited within the subsurface geology of the Earth). A 3D present-day structural model in the present-day geological space (e.g., comprising faults and folded horizons) may be transformed, via a forward transformation, to a corresponding 3D depositional structural model in the depositional coordinate space (e.g., without faults and with planar horizons). This forward transformation may simulate the reversal of time from the faulted and folded present-day subsurface geology to when the geology was originally unfaulted and unfolded as it was deposited in the past. Embodiments of the invention may use this depositional coordinate space as a target to transform various real-world parent images from the same or different region(s) of the Earth's subsurface. A real-world parent image may be transformed from a first subsurface region (e.g., depicting one part of the world) in the present-day geological space, via a forward transform, to a depositional image depicting a second different subsurface region (e.g., depicting another part of the world, different from the depositional region corresponding to the first subsurface region) in the depositional coordinate space. This transformation creates an entirely new variation of a subsurface configuration that is synthetic (e.g., is not predicted to have existed in the depositional geology of either of the two regions of the subsurface), but is still derived from the real-world parent image and thus embodies realistic geological complexity. The synthetic depositional image may then be transformed back from the depositional coordinate space, via a reverse transform, to the present-day geological space to generate a new synthetic child present-day image.

In various embodiments, the real-world parent image and each of the plurality of synthetic child training images may differ by the addition, deletion, rotation, translation, or scaling of one or more geological objects in the three-dimensional structural model. Additionally or alternatively, the real-world parent image and/or each of the plurality of synthetic child training images may differ by applying a plurality of different respective reverse transformations, e.g., to map each parent image to a different subsurface region. For example, the same fault from a parent image may be transformed forward to, and back from, the depositional space to a multiplicity of different subsurface regions, where the fault interacts differently in each region (e.g., intersecting different horizons or other faults). Additionally or alternatively, the real-world parent image and/or each of the plurality of synthetic child training images may differ by using a plurality of different respective configurations of the three-dimensional structural model in the present-day geological and/or depositional space(s). Additionally or alternatively, other perturbations may be applied to the parent and/or child images, such as, altering one or more of the synthetic child training images in a post-processing stage with the same or different alterations (e.g., to blur seismic features along faults and discontinuities).

Each real-world parent image may thus be transformed, perturbed and/or configured in a multiplicity of different ways to generate a multiplicity of different synthetic child training images. This one-to-many proliferation between a real-world parent image and the multiple resulting plurality of synthetic child training images generated therefrom results in a rapid growth of realistic training images derived from real-world recorded seismic data. The size and speed of the training dataset expansion may depend on this one-to-many (1:N) ratio, where there is e.g. an N-fold increase in the training database size when N training images result from each parent image. Additionally or alternatively, when multiple iterations of proliferation are used to generate multiple generations of synthetic descendant images, the size and speed of the training dataset expansion may grow exponentially (e.g., one parent may proliferate $N^P$ child images for P generations).

Using real-world recorded seismic data as the parent image may allow the resulting synthetic child training images to embody the complexities, diversity, errors and realism made possible by real-world data. A model trained using these realistic synthetic child training images proliferated from real-world parent images will typically interpret real-world images during run-time operation more accurately than if it were trained using conventional mathematically formulated synthetic images devoid of such realism. In addition, this proliferation increases the number of different training images (e.g., by a linear or exponential amount), which also improves the accuracy of the model trained thereon.

In various embodiments, the parent image and/or child training images may be any combination of full-size images (e.g., occupying the entire three-dimensional structural model) or sub-volumes (e.g., occupying only a portion of, but not the whole, the three-dimensional structural model). In various embodiments, a full-size real-world parent image may be converted to a plurality of sub-volume synthetic child training images, a full-size real-world parent image may be converted to a plurality of full-size synthetic child training images, and/or a sub-volume real-world parent image may be converted to a plurality of (the same or different) sub-volume synthetic child training images. In various embodiments, the plurality of sub-volume synthetic child training images may be distributed at locations in the three-dimensional structural model that are regularly spaced, randomly positioned, or preferentially distributed along one or more geologic objects.

Training labels defining seismic properties associated with one or more geologic objects from the three-dimensional structural model may be automatically generated for each of the plurality of new synthetic child training images. Example training labels include, but are not limited to, encoding the presence or absence of a geological object of interest, spatial characteristics of a geological object of interest, and/or geological-time. New training labels may be generated from scratch or by altering pre-existing labels associated with the parent image. In one example, the seismic interpretation training labels may be generated or altered that are associated with the object's fault type (e.g., altered from a reverse fault label associated with the parent image to a normal fault label associated with a child image, which may be due to a horizon perturbation). In another example, the seismic interpretation training labels may be generated or altered that are associated with the object's geometry type (e.g., directions, normal, azimuth, or other geometric labels). In another example, the seismic interpretation training labels may be generated or altered that are associated with spatial characteristics of a geological object of interest (e.g., dip/azimuth).

In various embodiments, seismic training images and associated feature labels may be used to train a model for automatic seismic interpretation using any artificial intelligence or data driven technology, including but not limited to, neural networks, k-nearest neighbors, regression, similarity learning and Support Vector Machines (SVM). A library of realistic seismic images and precise matching labels of geological features may have many uses in the domain of automatic seismic interpretation. For example, convolutional neural networks may be trained to identify geological features using the seismic images and labels as input in a training phase, then running on unknown seismic images to predict the labels. In another application, the realistic seismic images may be used to test the quality of seismic attributes computed from the image, such as, for example, coherence, by comparing those attributes to the labels which precisely match the seismic image.

Some embodiments of the invention are directed to generating training geological-featured images from existing real-world parent (e.g., reference) seismic image(s), possibly from a specific area of interest. The real-world parent image may be derived from seismic data captured from shallow and substantially unfolded and unfaulted parts of a seismic acquisition survey, folded and faulted parts of a seismic acquisition survey, or a combination thereof. The parent reference image may be associated with a background structural model that includes the major horizons and dominant faults of the subsurface geology.

Embodiments of the invention comprise adding to (e.g., inserting in) the reference structural model a small set of limited representative different types of geological features, such as small-to-large, normal and reverse, fault systems. The additional geological features in the structural model may not necessarily be aligned with the parent reference image.

In an embodiment of the invention, a system and method is first provided for mapping a real parent reference seismic image from a present-day geological "G" space (e.g., defined by spatial Cartesian system of coordinates (x,y,z)) to a depositional "G*" space (e.g., defined by Geochronological coordinates (uvt)), using a coordinate transformation, such as, t(x,y,z), u(x,y,z) and v(x,y,z) and vice-versa. In a "forward" or "direct" uvt-transformation, coordinate t(x,y,z) may represent the depositional geological-time when particles were originally deposited in the Earth at each location (e.g., x,y,z) as observed today, and {u(x,y,z),v(x,y,z)} may be the paleo-geographic coordinates which represent the spatial position of each particle at the depositional geological-time t(x,y,z) where the particle is predicted to have been originally deposited in the past. Because at the original depositional geological-time, before faulting and folding, sedimentary layers are typically deposited in uniform layers, the depositional image of the 3D structural sedimentary layers in the depositional G* space may be represented by a stack of flat, horizontal, unfaulted seismic events or layers.

Embodiments of the invention may automatically generate synthetic child training images with many different realistic structural scenarios using the above-mentioned coordinate transformations. Deformations may be applied directly in the geological space or in the depositional space, according to their nature.

Hence, embodiments of the invention may automatically generate a rich set of labeled synthetic child training images comprising the variety of different types, shapes, orientations, and scales of geological objects, such as, fault and horizon systems.

Synthetic child training images may be automatically created by sampling the structural model and reading the values for the mapped seismic image. Matching labels may be automatically computed from the underlying structural model. Stratigraphic and structural attributes of interest for automatic interpretation via artificial intelligence technologies, such as neural networks, may be generated from the coordinate transform itself.

The parent real-world seismic images may depict a particular area or terrain type under consideration (e.g., marine, land or transition zones). Good quality training images may improve the accuracy of artificial intelligence technologies, such as neural networks, to perform automatic seismic interpretation and aid geoscientists in building precise models of the subsurface.

Embodiments of the invention improve conventional training images creation processes as follows:

Generating Realistic Seismic Images:

Conventional synthetic images are initially generated as flat, unfaulted reflectivity volumes, which are then deformed by applying mathematical transformations to simulate the geological processes of faulting and folding. In reality, subsurface geology is complex and can rarely be mimicked by applying mathematical transformations such as shearing and translation to an initially flat volume. Using only mathematical rules, it may be difficult to simulate volumes that are geologically consistent and plausible. Furthermore, the seismic imaging process by which images of the real subsurface are produced may be affected by coherent noise, footprints due to acquisition geometry and many other limitations associated with the ability to accurately illuminate and image the subsurface grid points. To generate realistic seismic training images, a process should identify, formulate and parameterize a number of naturally occurring phenomena, which shearing, translation and random noise alone can hardly represent. Additionally, there is currently no validation process that ensures the validity of these geological scenarios, leaving the possibility of implausible synthetic images that would incorrectly train a model using artificial intelligence or other data driven technologies.

Embodiments of the invention solve this problem by creating realistic synthetic child seismic images based on real-world parent seismic images, instead of based on mathematically simulated volumes. In one scenario, e.g., as shown in FIG. 1, the parent image in geological space $G_A$ of region A may be transformed to a non-associated depositional space $G^*_B$ of a different region B, and reverse transformed back to a different geological space $G_B$ to introduce variations in the child image in the different region B. Variations in the child image are induced by the cross-region transformations between regions A and B, and so perturbations may or may not be applied at any stage of the transformations. For example, the sequence of transformations $G_A \rightarrow G^*_A = G^*_B \rightarrow G_B$ may be applied to convert the real world parent to the synthetic child image. In another scenario, the parent image in geological space $G_A$ of region A may be transformed to its own associated depositional space $G^*_A$ of the same region A, and back while applying a perturbation either in the depositional space $G^*_A$ or the geological space $G_A$ to introduce some variation in the child image. For example, the sequence of transformations $G_A \rightarrow G^*_A \rightarrow G_A$ may be applied with perturbations at one or more of the stages to convert the parent to the child image.

According to some embodiments of the invention, in the first scenario, the depositional G* space may be used as an intermediate space to map each real-world measured seismic image from a given area A onto a structural model associated with a different area B. Starting from geological space $G_A$, a first direct $(uvt)_A$-transformation of area of interest A is computed to map a real world parent seismic image from this area A to its corresponding depositional space denoted $G^*_A$. Additionally, starting from geological space $G_B$, a second direct $(uvt)_B$-transformation is computed to map a structural model from a second area of interest B (which may also be located at area of interest A) to its corresponding depositional space denoted $G^*_B$. Based on the fact that in any depositional space G*, horizons are in general all similarly flat and unfaulted, depositional spaces $G^*_B$ and $G^*_A$ may be set to be equal (even when their corresponding present-day geological spaces $G_A$ and $G_B$ are not equal):

$$G^* = G^*_A = G^*_B \quad (1).$$

Because most depositional spaces are similarly configured as flat strata, instead of mapping an image of first area A from geological space $G_A$ to its own depositional area $G^*_A$ for its own area A, embodiments of the invention map the image of first area A from geological space $G_A$ to a different non-corresponding depositional space $G^*_B$ for the different area B (e.g., an area containing a non-corresponding structural model). Transforming the image of area A into the wrong depositional space $G^*_B$ for area B simulates an entirely new and synthetic geology that does not exist in the present-day, nor existed in the past depositional time, yet is created from and embodies real-world geology. This real world geology is not exclusively from area A (the parent image region) or exclusively from area B (the structural model region), but a combination merging and mixing real-world geology from both areas A and B (e.g., real-world seismic data from area A and structural geology from area B).

A reverse-$uvt_B$-transformation may then be applied from area of interest B to project the image from depositional space $G^* = G^*_A = G^*_B$ to a synthetic child image in the geological space $G_B$ of area of interest B. Areas A and B may have different topology and geometry, so generating a new synthetic child image in region B by transforming a real-world geological image from region A creates a new hybrid mixture of geological properties from two different regions A and B that does not currently, and did not previously, exist in any region of the real world.

Transposing a real seismic image in all its complexity from $G^* = G^*_A = G^*_B$ to a plurality of different structural models $\{G_{B1}, G_{B2}, \ldots\}$ adds to the diversity of structural model/seismic image pairs to generate multiple synthetic child images in respective areas $\{B1, B2, \ldots\}$ for each parent seed image of area A. According to this embodiment of the invention, the real seismic image related to a geological space $G_A$, may automatically be projected into another geological space $G_{Bj}$ where labels of structural geological features (e.g., faults, unconformities, horizons, ...) are known. By varying indexes (i,j), a large number of labeled seismic images may therefore be automatically generated in spaces $\{G_{Bij}: ij=11, 12, \ldots, 21, 22, \ldots\}$. Moreover, by applying rotations, translations, scaling, and non-linear geometrical transformations to each $G_{Ai}$ and each $G_{Bj}$, one may automatically generate even more labeled seismic images in spaces $\{G_{Bij}: ij=11, 12, \ldots, 21, 22, \ldots\}$. In various embodiments, the geological spaces of the child images $G_{Bij}$ may represent different sub-volumes of the original image area A or may represent one or more entirely new sub-volumes or full-size areas B.

In some embodiments of the invention, the real parent seismic image of the area A under consideration, which has been created through the (e.g., already performed) complex and time-consuming process of building the structural velocity-depth model and performing the ultimate seismic imaging method, is used together with a structural model (e.g., its associated structural model in the same area A or in a different area B) as the reference input data. The resulting child synthetic training images, generated by transforming and/or permuting those real parent seismic images, are thereby generated significantly faster than if the synthetic training images were generated by the conventional time-consuming imaging process from scratch. The input reference image may identify the major physical and non-physical noise/artifacts associated with the investigated subsurface, and may reflect the full geological complexity of the subsurface. By altering both the reverse-$uvt_B$ transformation applied to project the image from depositional space $G^* = G^*_A$ back into the geological space $G_B$ and the geological space $G_B$ itself (in the first scenario), and/or by perturbing the image in the geological space $G_A$ or depositional space $G^*_A$ (in the second scenario), real world geology such as different types of faulting and folding or complex stratigraphic layering may be created, not based on mathematical simulations applied to a flat image, but based on real structural data, a real seismic image from a real subsurface area of interest, and reflected geometries directly resulting from such geology. Using such real world images as a seed to propagate new synthetic training images trains the automatic seismic interpretation model (e.g., neural network) to more accurately identify real world geology as compared to using the mathematically simulated images.

Fast, Accurate and Rich Labeling:

A training image for an artificial intelligence model, such as a neural network, associates a seismic image with labels to train the model to recognize desired features in new seismic image volumes. These labels may indicate where geological features, such as e.g., faults, are located inside the volume and how stratigraphic events, such as e.g., horizons and layers, are organized. Conventional methods rely on manual labeling of the features, in which geoscientists analyze seismic images and interactively provide interpretations for faults and stratigraphy. This process is labor-intensive, which limits the number of labeled training images which may be built, error prone e.g., due to human error and variation, and non-standardized where e.g., different geoscientists may use different syntax or descriptors to denote the same feature. It is difficult for a human operator to accurately pick all relevant geological features inside a volume and any errors or omissions in the process lead to bias in the training of the model, which decreases the quality of its results in interpreting new data sets.

Embodiments of the invention address this problem by automatically generating labels for each synthetic child seismic training image directly from a valid structural model $G_{Bj}$. For example, true faults in $G_{Bj}$ (e.g., with their known properties, such as, fault throw, dip and azimuth) are inserted into the reference structure to obtain their actual (known) seismic signatures; hence they can be reliably classified and labeled as part of the training library.

For each geological domain $G_{Bj}$, the full stratigraphy may also be known and the system provides rich labels such as major horizon identification, geological layer identification, stratigraphic style (e.g., layer erosion or onlap), relative deposition time of the stratigraphic layers, etc. In addition to the reliability and consistency of such automatic labelling, as this process is fully automatic, embodiments of the invention significantly decreases the amount of time used to label new training images.

Diversity of Training Images:

Conventional methods either generate synthetic seismic training images and labels through mathematical transformations or using manually interpreted seismic images. In the first case of mathematical formulations, the seismic training images may be numerous but are similar in terms of the geological phenomena they illustrate and, therefore, do not bring "new" information to train models. Generating folds and faults through a mathematical process, even though randomized, will result in images that share many characteristics, and may be geologically invalid (non-plausible) as no validation is integrated to the procedure. Manually interpreted images on the other hand may be much more difficult to produce and may result in biased training Because the accuracy of automatic seismic interpretation by artificial intelligence models depends on the quality and diversity of images and labels used in their training, these synthetic and manual approaches result in poorly trained models.

Embodiments of the invention solve this problem by providing diverse, reliable training images by automatically sampling a variety of plausible structural models based on real structural models and real seismic images. A plurality of seismic images may be combined with a plurality of structural models to generate numerous and diverse training images and labels which reflect the true complexity of the subsurface. Applying geologically plausible mathematical transformations to the coordinates used to map the real seismic images to the real structural models also produces new realistic variations in the created training images.

Mapping to Depositional Space

For the sake of clarity and for the purpose of simplifying the presentation of embodiments of the invention, the following preliminary definitions are given, although other definitions may be used:

Depositional Model:

A depositional model G* may be generated by inputting a structural model G of the present-day subsurface geology of the Earth and transforming that geology to a past depositional time as each particle is predicted to have been configured when originally deposited in the Earth. Sedimentary particles are typically deposited over time in layers from deepest to shallowest and from the earliest to the most recent geological time periods. Since various layers of terrain are deposited at different geological times, a depositional model does not image the geology at any one particular time period, but across many times periods, each layer modeled at the geological time when the layer was deposited. Accordingly, the vertical axis or depth in the depositional model may be a time dimension representing the geological time period of deposition, progressing from oldest to newest geological time as the model progresses vertically from deepest to shallowest layers.

Geological-Time:

A particle of sediment in a geological terrain may be observed at a location in the subsurface. The location of the particle may be mathematically represented or modeled, e.g., by a point with present-day geographic coordinates (e.g., x,y,z), in a three-dimensional (3D) space G, such as the Cartesian coordinate system (of course, when modeling such particles, the position of many particles may be modeled together as for example using a cell or a center point of this cell called a "node"). When modeled, a data structure such as a node or cell may represent particles. The time when the particle of sediment was originally deposited may be referred to as the "geological-time" and may be represented or modeled, e.g., as a geological-time function of the current location of the particle, $t(x,y,z)$. When used herein, a "current," "present-day," or modern-day location for a particle (or data structure representing one or more particles) or subsurface feature may mean the location of the item as it was measured in a current era, relative to geological time. The actual geological-time of the deposition of particles may be difficult to determine and may be replaced, e.g., by any arbitrary monotonic function of the actual geological-time. The monotonic function may be referred to as the "pseudo-geological-time". Geological-time and pseudo-geological-time are referred to interchangeably herein.

Level Surface:

The geological domain may be defined in a 3D space by a given function of geological-time, $t(x,y,z)$. The geological-time function $t(x,y,z)$ may be monotonic, e.g., the magnitude of the gradient of the geological-time is positive and never vanishes and the function has no local maximum or minimum values. A level surface, $H(t_0)$, may be the set of points where the geological-time $t(x,y,z)$ is equal to a given numerical value, to. Therefore, if the geological-time $t(x,y,z)$ represents a pseudo-geological-time of deposition, then the level surface $H(t_0)$ of $t(x,y,z)$ may be a geological horizon. Various mechanisms are currently used for modeling subsurface geological terrains:

Depositional Model, G-space and G*-space:

When layers of particles were deposited during certain geological-time periods in the past, the layers typically had uniform horizontal geometry not cut by faults. However, through time, the layers may be folded, eroded and disrupted by faults resulting from tectonic motion or other sub surface movements, which result in uneven and discontinuous layers. As compared to the uniform layer geometry of the past, the discontinuous layers of the present are difficult to model.

Accordingly, "Depositional" models have been developed to operate between two 3D spaces. These two 3D spaces or models may be, for example:

A 3D space G, called the "Geological Space", representing a model of the current subsurface features observed in modern times or today (e.g., current modeled locations of particles of sediment in the terrain). The modeled location of each particle (or of a subset of particles, or of cells estimating the location of numerous particles) may be represented by the coordinates (x,y,z), where (x,y) may describe the present-day geographical coordinates of the particle (e.g., latitude and longitude) and (z) may describe the present-day altitude or distance below or above a given reference surface level (e.g., the sea level); and A 3D space G*, called the "Depositional Space", representing modeled locations of particles of sediment at the time when the particles were originally deposited. The modeled location of each particle may be represented by the coordinates (u,v,t) where (t) may be the geological-time of deposition of the particle and (u,v) may be the paleo-geographical coordinates of the particle at geological-time (t).

In one embodiment, the depositional model may be the GeoChron™ model, which is generated by SKUA™ software, that is routinely used by many oil & gas companies to build models of geologic reservoirs which help optimize hydrocarbon production and exploration. An example implementation of the GeoChron model is discussed in U.S. Pat.

No. 8,600,708, which is incorporated by reference herein in its entirety. The depositional model is described in reference to the GeoChron model only for example, though any other depositional model may be used.

The GeoChron model defines a transformation between the two 3D spaces G and G*. The transformation may be referred to as a "uvt-transformation". The GeoChron model applies a forward uvt-transformation to transform the current model (a model of the subsurface features current in time) in G-space to the original deposition model in G*-space and applies an inverse uvt-transformation to transform the original deposition model in G*-space to the current model in G-space. Accordingly, the GeoChron model may execute complex computations on the original deposition model in G*-space where geological properties are typically uniform and simple to manipulate relative to the discontinuous current model in G-space. Using the "reverse uvt-transformation", the GeoChron model may transform the model back to the current time domain to map the deposition model to the current model.

Horizons, Faults and Unconformities:

In stratified layers, horizons, faults and unconformities may be curvilinear (e.g., non-planar) surfaces which may be for example characterized as follows:

A horizon, $H(t_0)$, may be a level surface of the geological time function $t(x,y,z)$ corresponding to a plurality of particles of sediment which were deposited approximately at substantially the same geological-time ($t_0$).

A fault may be a surface of discontinuity of the horizons that may have been induced by a relative displacement of terrains on both sides of such surfaces. In other words, the geological-time $t(x,y,z)$ of deposition of the sediments is discontinuous across each fault. Faults may cut horizons and may also cut other faults.

An unconformity may be a surface of discontinuity of the horizons that may have been induced by for example an erosion of old terrains replaced by new ones. In other words, similarly to faults, the geological-time function $t(x,y,z)$ of deposition of the sediments is discontinuous across each unconformity. Unconformities may be surfaces bounding a sequence of sedimentary layers and one specific geological-time function $t(x,y,z)$ may be assigned to each such sequence.

Paleo-Geographic Coordinates:

Each particle of sediment observed today at geographical coordinates (x,y) and altitude (z) is predicted to have been deposited at paleo-geographical coordinates $u(x,y,z)$ and $v(x,y,z)$ which may differ from the current geographic coordinates (x,y). The GeoChron model may provide equations and algorithms allowing the geological-time function $t(x,y,z)$ and paleo-geographical coordinates $u(x,y,z)$ and $v(x,y,z)$ to be modeled at any present-day location (x,y,z) in the subsurface.

Reference is made to FIG. 1, which schematically illustrates a transformation from a present-day model 10 to a depositional GeoChron model 12, according to some embodiments of the invention. This transformation from a particle of sediment observed today at location $r=r(x,y,z)$ in the present-day geological domain G to a depositional location $r^*=r^*(u,v,t)$ in the depositional geological domain G* may be referred to as a (direct/forward) "uvt-transform." The new depositional location $r^*$ may have a vertical coordinate that is the geological time $t(r)$ when the particle observed today at location r was deposited and may have horizontal or paleo-geographic coordinates $\{u(r), v(r)\}$ equal to the lateral spatial location where the particle at r was located at its depositional time $t(r)$. The paleo-geographic coordinates $\{u(r), v(r)\}$ may be linked to the vertical time coordinate $t(r)$ by different relationships (e.g., constrained by different systems of differential equations) depending on the structural style of their deposition (e.g., minimal deformation or flexural slip).

In some embodiments, the depositional (e.g., GeoChron) model 12 may include one or more of the following data structures stored in a memory:

A network of geological faults within the present-day domain G.

A 3D corner-point grid F that fills the G-space with 3D polyhedral cells (e.g., tetrahedra or hexahedra), preferably without any gaps or overlaps in the studied domain, in such a way that no cell edge crosses any fault. The location of each node a of grid F in the G-space is denoted r(a).

A tectonic style which may be either a "minimal deformation" style or a "flexural slip" style. Choosing this tectonic style may be a model decision made by a structural geologist.

A triplet (e.g., $\{u(r), v(r), t(r)\}$) of discrete coordinates defined on a 3D grid F of the geological G-space, such that, for a particle of sediment observed today at location r, the coordinate values $\{u(r), v(r)\}$ represent the paleo-geographic coordinates of the particle at geological-time $t(r)$ during the time period when it was deposited. According to the depositional (e.g., GeoChron) model, the paleo-geographic coordinates $\{u(r), v(r)\}$ may honor different differential equations depending on the tectonic style.

It would be appreciated by a person of ordinary skill in the art that the GeoChron model 12 and its features described herein are discussed only as an example of a depositional model and that these elements may differ in other models or implementations without changing the essence of the invention.

Mapping a Seismic Image from the Present-Day Geological Space to the Depositional Space The "Depositional Space" G* represents modeled locations of particles of sediment at the time when the particles were originally deposited. The modeled location of each particle may be represented by the coordinates (u,v,t) where (t) may be the geological-time of deposition of the particle and (u,v) may be the paleo-geographical coordinates of the particle at geological-time (t).

Reference is again made to FIG. 1, which schematically illustrates a structural model 12 in the depositional space G*, according to some embodiments of the invention. In the example shown in FIG. 1, depositional model 12 is a GeoChron model, which may be configured as a regular structured grid D*, e.g., made of identical hexahedral cells associated with the depositional space G* such that specific values, or ranges of values, of coordinates triplet (u,v,t) refer to specific cells of structured grid D*. A real-world parent seismic image (not shown) of region A in present-day geological space $G_A$ may be transformed to structured grid D* in depositional space $G^*_B$ of region B to generate depositional seismic image 14. The transformation may assign, to each cell of structured grid D*, a value of a seismic attribute such that structured grid D* represents depositional seismic image 14. As structured grid D* belongs to the depositional space G* where geological layers are flat and continuous (prior to folding and faulting by tectonic processes), the parent seismic image (or portions thereof) from which values are mapped to structured grid D* may be mapped without the uvt-transform when values are extracted from shallow parts of real acquisition surveys where the geology is substantially unfolded and unfaulted and seismic reflectors are not disrupted by those processes, and/or may be mapped with the uvt-transform when values are extracted from deeper or older, folded and/or faulted, parts of a seismic acquisition survey, to flatten and remove fractures in the model.

The real world parent seismic image mapped to the depositional space G* may thus be representative of realistic acquisition conditions and may hold features such as noise and acquisition footprints which are difficult to reproduce when generating artificial data.

Mapping a Seismic Image from the Depositional Space to the Geological Space

Each grid node a of the 3D corner-point grid $\Gamma$ which covers the geological space G may be associated with a location r(a) in geological space G and a triplet $\{u(r), v(r), t(r)\}$ of coordinates mapping location r to its position r* in the depositional space G*.

Reference is again made to FIG. 1 where, e.g., using 3D texture mapping techniques, a real depositional seismic image 14 contained in the depositional grid D* (in depositional space G*) is mapped, by a (reverse/backwards) uvt-transform, to the grid $\Gamma$ of a present-day child seismic image 16 in the geological space G. The reverse transform may, for each cell of grid $\Gamma$, receive coordinates $\{u(r), v(r), t(r)\}$ of each cell node a, and look up values for the present-day seismic image 16 from grid D* at the cell location in depositional space G*. Transforming the real world parent seismic image (not shown) of region A in geological space $G_A$ to depositional image 14 of a different region B in a non-associated depositional space $G^*_B$, and back again to a different geological space $G_B$ of the different region B≠A (e.g., $G_A \rightarrow G^*_A = G^*_B \rightarrow G_B$) may induce cross-region A and B variations to generate a new synthetic child image 16 in new region B.

Reference is again made to FIG. 2, which schematically illustrates a texture-mapping process along a region 20 in geological space G (e.g., a section where the paleo-geographic coordinate v is assumed constant, for simplicity). At different locations $\{1, 2\}$ on the top horizon and $\{3, 4\}$ on the bottom horizon displayed on region 20, coordinates u and t may be received from the previously computed (direct) uvt-transformation. In the depositional image 22 of the region in the G* space, the three horizons are flat and values of u represent a lateral (constant or iso-value) coordinate. Values for the flat seismic image 22 in the G* space may be retrieved at locations $(u_1, t_1), (u_2, t_2), (u_3, t_3)$ and $(u_4, t_4)$ and transformed to generate a child synthetic image 24 at matching locations in the G space using a reverse uvt-transformation.

The real parent seismic image 20, which corresponds to a depositional image 22 with seismic reflectors that are flat and continuous in depositional space G*, is thus transformed into a seismic image 24 disrupted by tectonic processes such as faulting and folding in geological space G, using the deformation information recorded in the uvt-transformation. As this transformation derives from the full structural complexity of the present-day, folded, faulted and eroded geological model, real geological processes and phenomena may be applied to deform the seismic image without explicitly formulating them as mathematical transformations such as translation and shearing. Furthermore, as the uvt-transformation represents a real geological structure as observed in the subsurface, the synthetic child seismic image 24 mapped to the geological space G represents a valid, plausible geometry of seismic reflectors and discontinuities.

Generating Seismic Training Images from the Geological Model

The deformed seismic image in the depositional space mapped (back-projected) to the geological space G may be subdivided in two-dimensional slices or three-dimensional volumes. The size of these sub-volumes may be defined in, for example, meters and large enough that sub-volumes contain the geological features under consideration but not too large to avoid entangling multiple features. Sub-volumes may then be rescaled to, for example, sizes of 256×256 pixels or 128×128×128 pixels, suitable for training artificial intelligence models, such as, neural networks. Locations of sub-volumes in the geological space G may be picked randomly. Alternatively, features of particular interest such as faults, fault contacts or stratigraphic discontinuities may be targeted by automatically picking locations from these features either in the structural model or in the G* space where the geometric transformations were applied.

Figure 4:
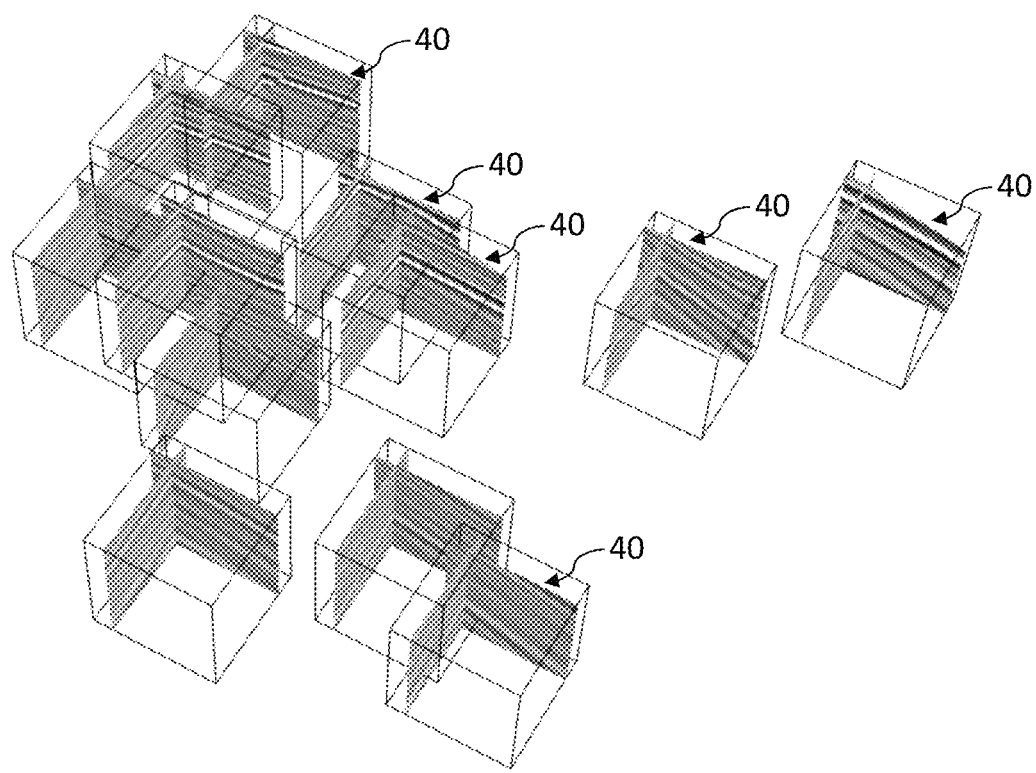
FIG. 4 schematically illustrates a plurality of synthetic child training images generated from a random sampling of faulted locations in a structural model, according to some embodiments of the invention.

Reference is made to FIG. 4, which schematically illustrates a plurality of synthetic child training images 40 generated from a random sampling of faulted locations in a structural model, according to some embodiments of the invention. In some embodiments, a plurality of sub-volumes are generated from fault locations in a structural model (e.g., 10 of FIG. 1). A synthetic child training image 40 is mapped to the geological space G inside each sub-volume (e.g., $G_{B1}$, $G_{B2}, \ldots, G_{BN}$) where it is displayed.

A geological model and/or seismic images may be full-size (e.g., occupying the entire three-dimensional structural model, such as, a whole hydrocarbon reservoir and surrounding area, or a whole sedimentary basin) or sub-volumes (e.g., occupying only a portion of, but not the whole, three-dimensional structural model). In some embodiments, the size of a geological model may be many times greater than the size of the training images. Thus, many different sub-volumes containing a variety of geological features may be generated from one given geological model.

Generating Training Labels from the Geological Model

Figure 5:
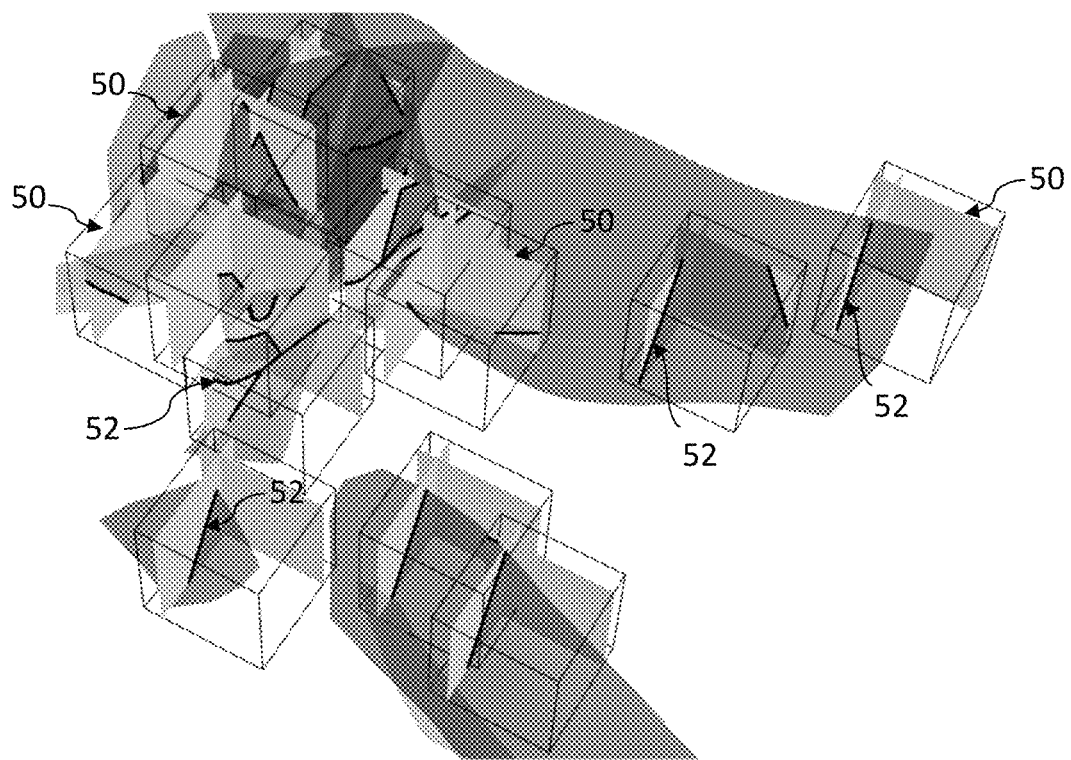
FIG. 5 schematically illustrates training labels identifying faults associated with the plurality of synthetic child training images of FIG. 4, generated according to some embodiments of the invention. Uncut surfaces represent the absence of faulting in the structural model and thick, black lines represent where a fault from the structural model is located.

Each sub-volume may be generated as a "window" centered on a particular location in the geological model. At this location, the structural model provides all the geological information required to generate accurate training labels associated with the sub-volume. Training label information may be read from the structural model and stored in a sub-volume with the same size as the training image. Training label information may include any combination of one or more of the following example label types (although other training label information may also be used):

Fault indicator: A different label value may be assigned to each pixel in the label image according to whether a fault from the structural model goes through this pixel. As an example, value "1" may be stored at each pixel where a fault or several faults are located, and value "0" may be stored at each pixel where no fault is recorded. Reference is made to FIG. 5 where such sub-volumes are displayed at locations matching the seismic training images from FIG. 4. In FIG. 5, pixels along uncut surfaces 50 represent locations where no fault is present and pixels along faults 52 represent locations where one or several faults are present.

Fault identity: Different faults in the structural model may be associated with different identifier values in the training label. For example, the first fault listed in the structural model may be associated with a fault identifier value "1", the second fault with fault identifier value "2", and so forth. The label image may then store the fault identifier value associated with a particular fault at any pixel where this fault is located, and may store a different value, such as "0", for pixels where no fault is located. An additional distinct label may store values for pixels where several faults intersect in the structural model. Each fault intersection may be associated with a particular label value, or with a label value related to a distance to points where several faults intersect.

Fault dip and azimuth: Similarly, at each pixel in the label image where a fault is located, geometric properties of the fault such as its orientation (e.g., azimuth) and tilt (e.g., dip) may be read from the structural model and associated to the pixel. Pixels where no fault is located may store a value "0" or any other value with the convention that this value records the fact that no fault is present.

Horizon identity: Successive horizons in the geological model may be associated with different horizon identifier values. For example, the first horizon listed in the structural model may be associated with horizon identifier value "1", the second horizon with horizon identifier value "2", and so forth. The label image may then store the horizon identifier value associated with a particular horizon at any pixel where this horizon is located, and may store a different value, such as "0", for pixels where no horizon is located. Additionally or alternatively, each horizon may be associated with a value indicating the geological-time of the horizon's deposition as stored in the depositional model.

Geological layer identity: Geological layers may be defined as parts of the structural model where the geological-time is within a given interval $[t_0, t_1]$, where $t_0$ and $t_1$ may be geological-time values associated with different horizons. Any geological layer thus described may be associated with a unique identifier value, e.g. "1" for the first layer, "2" for the second, and so forth. Any pixels in the label image located within a given geological layer may thus be assigned the corresponding identifier value.

Geological-time: A label image of geological time (e.g., $t(x,y,z)$) may be created by assigning to each pixel in the label image the corresponding value of the geological-time read from the depositional model.

Gradient of geological-time: A label image of gradient of geological time may be created by assigning to each pixel in the label image the corresponding values of the three components of the gradient of the geological-time read from the depositional model. Alternatively, a label of the norm of the gradient of the geological-time, a unit vector parallel to this gradient, or another derivation thereof, may be created in a similar manner.

Paleo-geographic coordinates: A label image of paleo-geographic coordinates (e.g., u, v) may be created by assigning to each pixel in the label image the corresponding values of the paleo-geographic coordinates read from the depositional model.

Gradient of paleo-geographic coordinates: A label image of gradient of paleo-geographic coordinates (e.g., u, v) may be created by assigning to each pixel in the label image the corresponding values of the three components of the gradient of each of the paleo-geographic coordinates read from the depositional model. Alternatively, a label of the norm of the gradient of each of the paleo-geographic coordinates, a unit vector parallel to each of these gradients, or another derivation thereof, may be created in a similar manner.

Figure 6:
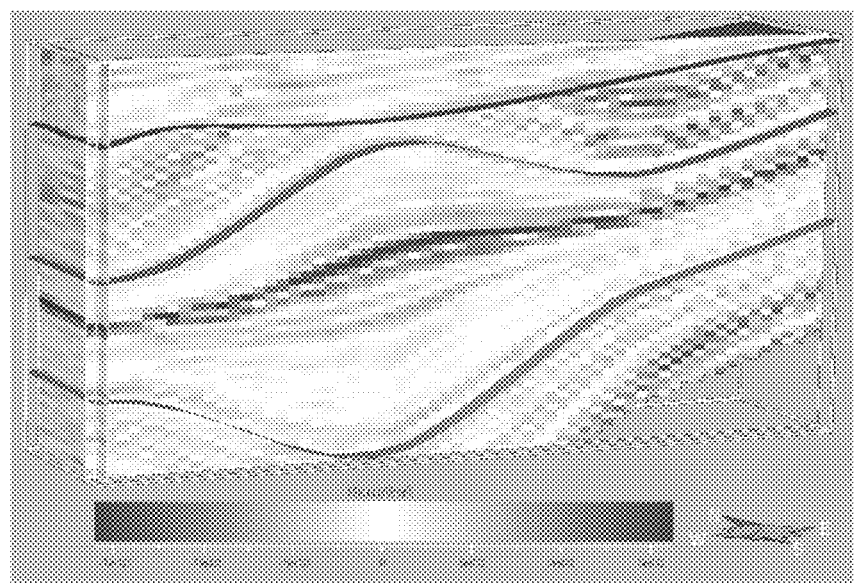
FIG. 6 schematically illustrates a synthetic child seismic training image generated from a structural model with lateral variations in thickness of its layers and having undergone erosion, according to some embodiments of the invention.
Figure 7:
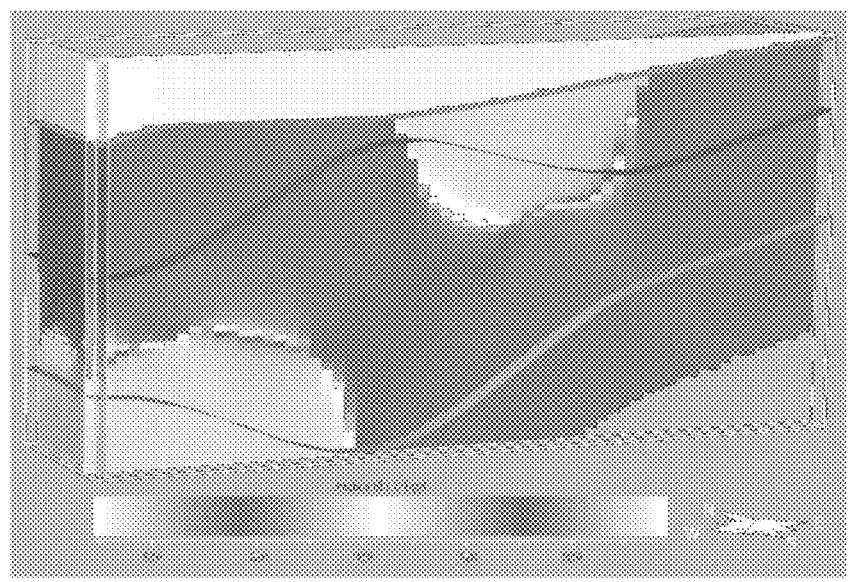
FIG. 7 schematically illustrates an azimuth label matching the synthetic child seismic training image from FIG. 6, generated according to some embodiments of the invention.
Figure 8:
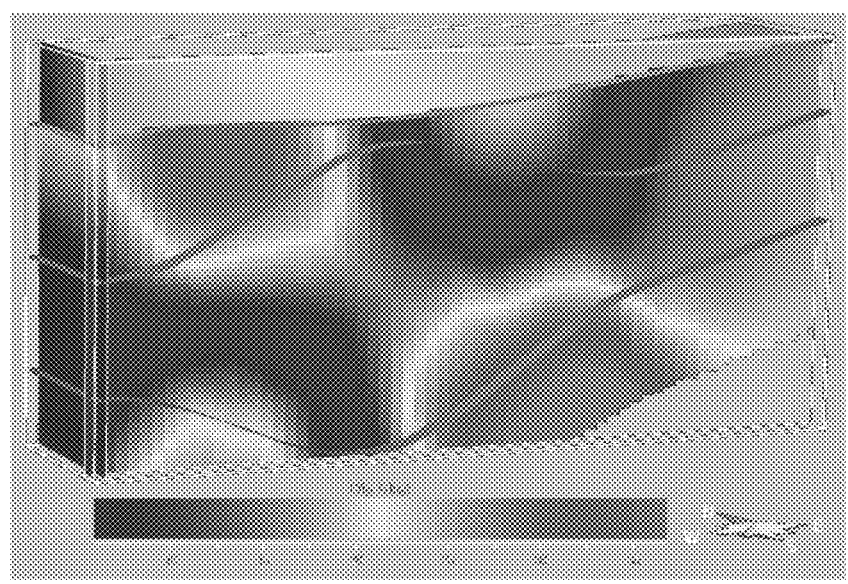
FIG. 8 schematically illustrates a dip label matching the synthetic child seismic training image from FIG. 6, generated according to some embodiments of the invention.

Reflector dip and azimuth: From the geological-time, reflector dip and azimuth may be extracted by computing the gradient of the geological time. A label image of dip and a label image of azimuth may be created by assigning each pixel of the label image the dip or azimuth value computed from the geological-time in the structural model. Reference is made to FIG. 6, which schematically illustrates a synthetic child seismic training image generated from a structural model with lateral variations in thickness of its layers and having undergone erosion. Reference is made to FIG. 7, which displays the reflector azimuth for a label sub-volume matching the seismic training image shown in FIG. 6. Values of the azimuth label represent values of reflector azimuth shown on the scale. Similarly, FIG. 8 shows a reflector dip label volume associated to the seismic training image shown in FIG. 6. Values of the dip label represent values of reflector dip shown on the scale.

It would be appreciated by a person of ordinary skill in the art that training labels described herein are discussed only as example labels and that these labels and their details may differ in other implementations without changing the essence of the invention.

Using the structural model and its link to the depositional space both to create the seismic training image and the associated labels ensures that the labels are accurate, consistent and geologically realistic, because both the structural deformation applied to the seismic image and the attributes computed as labels are based on the same uvt-transformation computed from a valid real-world geological model of the measured subsurface geology.

Applying Transformations to the Depositional and Geological Models

Diverse training images with labeled geological features may be used to train artificial intelligence models, such as neural networks, to recognize desired geological features in any possible geometric configuration. In order to increase the number and diversity of generated training images and labels, embodiments of the invention may apply transformations to the depositional or structural model to create a plurality of sets of synthetic child images from the same source real-world parent image.

To generate a multiplicity of child images, the u and v paleo-geographic coordinates of the uvt-transform are not unique and may be perturbed (e.g., rotated, translated, scaled, etc.) to generate new transforms to depositional spaces. Mapping the same seismic image from the depositional space back to the geological space, after applying multiple different perturbations (e.g., rotations) in the depositional space, may generate several child seismic images, from the same location in the structural model, with different seismic features. More generally, non-linear deformations may be applied to images both in the depositional space and the geological space.

Similarly, perturbing, such as rotating and translating, the geological model may generate seismic training images and associated labels where the orientation of desired geological features such as faults may vary, thus providing more diversity for an automatic seismic interpretation model to recognize and predict these features in a new seismic images during a run-time phase.

Additionally or alternatively, dimensions of the structural model, such as the lateral dimensions x and y, and the vertical dimension z, may be perturbed (e.g., stretched or shrunk) to generate more diverse structural models (e.g., by changing fault dip as a result of scaling). In this instance, the corresponding uvt-transform, derived from the geometry of the structural model, may be recomputed after each set of geometric transformation perturbations have been applied and before the associated child seismic training images and associated labels are generated.

Figure 3:
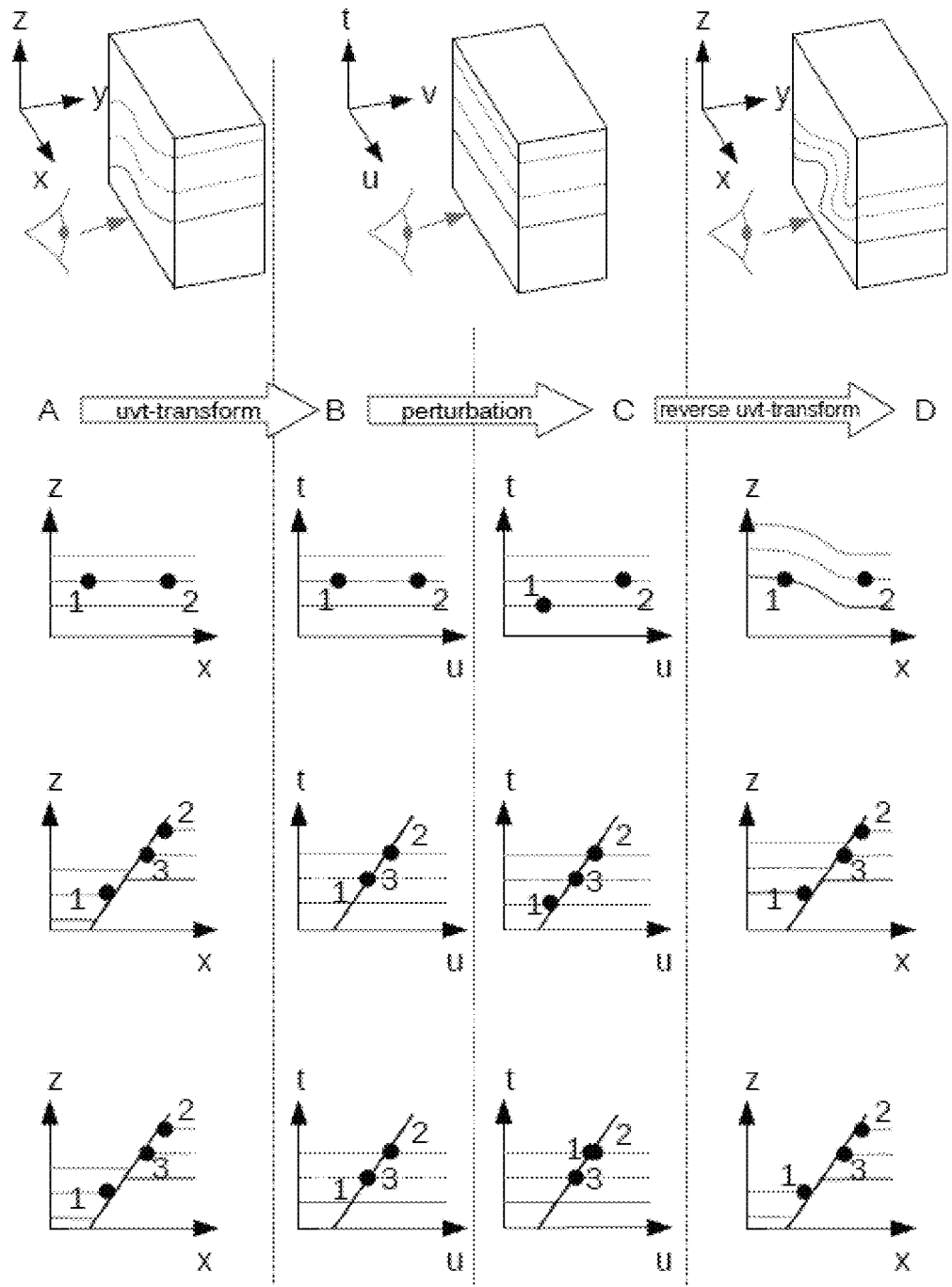
FIG. 3 schematically illustrates three example scenarios of three new structural models created by applying perturbations in the depositional space G*, thus creating different, plausible and valid structural geometries in the depositional space G*, according to some embodiments of the invention. A reverse coordinate transformation then transports the flat parent seismic image from the depositional space G* to the geological space G for all three different deformed models, thus creating three different and realistic faulted and folded child seismic images.

Perturbing the model mapped to the depositional space by applying valid transformations such as node displacement in the depositional space may generate different structural geometries in the geological space. Reference is made to FIG. 3, which schematically illustrates three examples of perturbations applied in the depositional space, according to some embodiments of the invention. The three perturbations each result in different, valid and plausible structural geometries in the geological space. In the first example perturbation, moving node '1' downwards along the 't' axis produces a fold in the geological space. In the second example perturbation, moving node downwards along a virtual representation of a fault in the depositional space results in reduced fault throw in the geological space. In the third example perturbation, moving node '1' upwards along a virtual representation of a fault in the depositional space results in increased fault throw in the geological space. These illustrations show movement applied only to one node for simplicity but embodiments of the invention encompass transformations displacing all (or many) nodes applied in the depositional space in a manner that preserves model validity. These three examples illustrate three transformations in the depositional space, but are not meant to be limited, as other methods may be applied in the present-day geological space or other coordinate spaces.

Various valid geological scenarios may be created by perturbing an initial structural model whilst ensuring the consistency and validity of each perturbed model. An example implementation of a method of generating valid realizations from an initial structural model is discussed in U.S. Pat. No. 8,600,708. A real or synthetic seismic image may then be mapped to each such geologically valid, equiprobable realization of a structural model, which may then be sampled to create seismic training images and associated labels.

Figure 9:
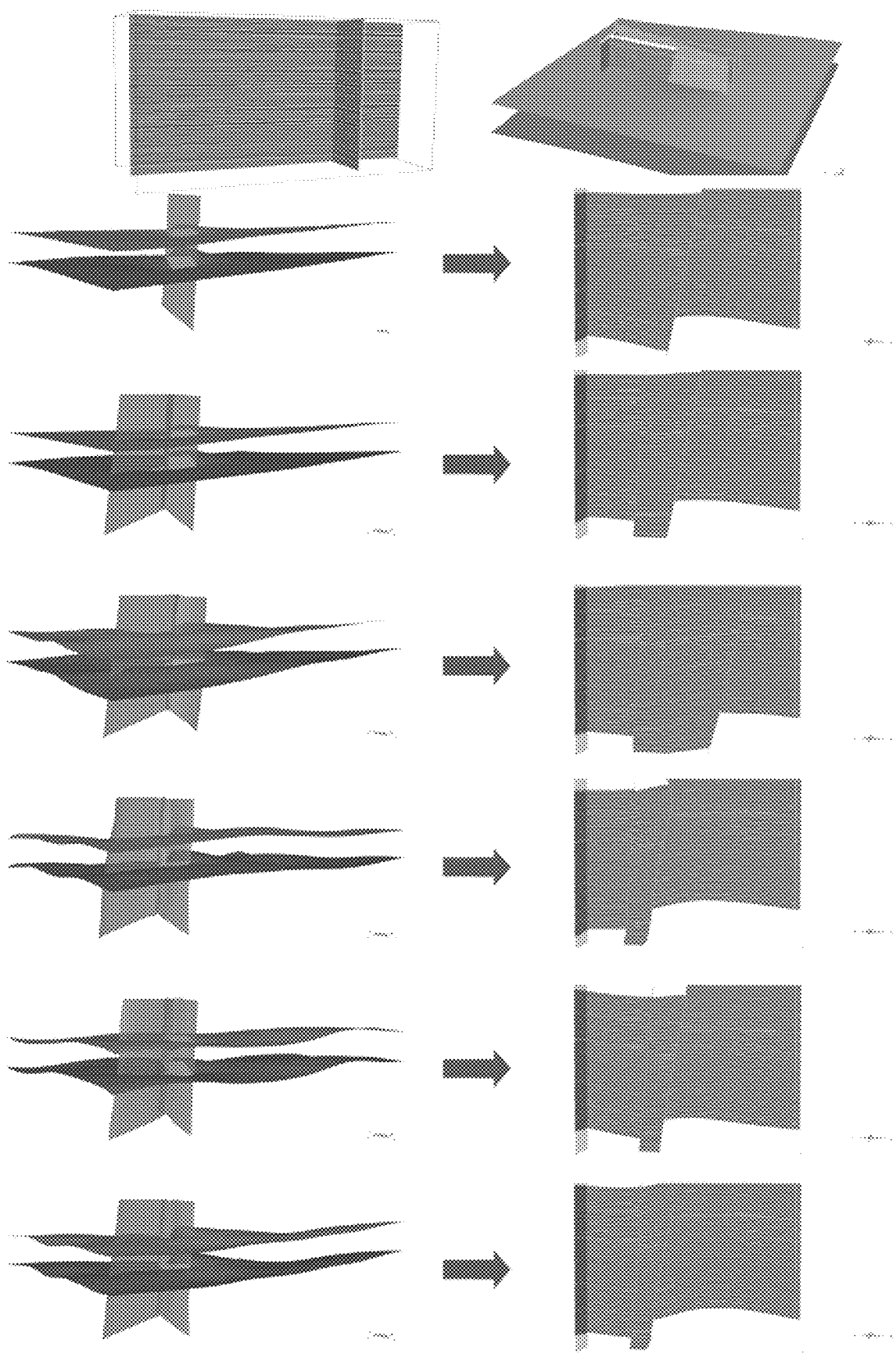
FIG. 9 schematically illustrates data structures for using a single real-world parent seismic image as a seed to propagate into multiple synthetic child seismic images and associated structural labels, according to some embodiments of the invention.

Reference is made to FIG. 9, which schematically illustrates data structures for using a single real-world parent seismic image as a seed to propagate and generate multiple synthetic child seismic images and associated structural labels, according to some embodiments of the invention. An original (e.g., reference) 3D structural model 90 may be generated (e.g., in the geological G space). From the original 3D structural model 90, embodiments of the invention may generate multiple different structural models 92a-f, each of which may represent different structural scenarios, e.g., by adding or removing a fault, or by perturbing the geometry of an initial structural model 90. An example of a single scenario (out of many other scenarios) is new structural models 92a-f may be created by operating on (e.g., deforming by faulting and/or folding) the original (e.g., reference) 3D structural model 90 (e.g., in the geological G space), thus creating different systems of faults and folded horizons. The same parent seismic image may be mapped, via a forward transform, to the transform of these multiple different structural models 92a-f in the depositional space G*. A reverse coordinate transformation may then transport their flat seismic image from the depositional space G* back to the present-day geological space G (this process may be performed for all the different deformed models), thus creating a plurality of realistic synthetic faulted and folded child seismic images 96a-f. Mapping the parent seismic image to different structural models 92a-f (or their corresponding depositional structural models) may result in a variety of realistic set of child training images 96a-f associating real seismic data from the parent with new valid (though synthetic, non existing) geological structures.

Starting from a limited number of structural models with a limited number of geological features, geometric transformations and equiprobable geological realizations may increase the number and diversity of training images and labels that are created automatically in some embodiments of the invention.

Post-Processing Seismic Training Images

Real seismic images of the subsurface may feature some blurring in the neighborhood of faults, as a result of the complex geometry of the reflective structures in those areas. Using the reverse uvt-transform to map a flat seismic image to the geological space G may result in very sharp fault features in the faulted seismic image, which may not be geophysically realistic. As fault location may be retrieved from the structural model, a post-process stage using, as an example, a three-dimensional Gaussian convolution kernel, may be applied to the training seismic image to blur the data selectively at any pixel located on a fault or in the close neighborhood of a fault.

Figure 10:
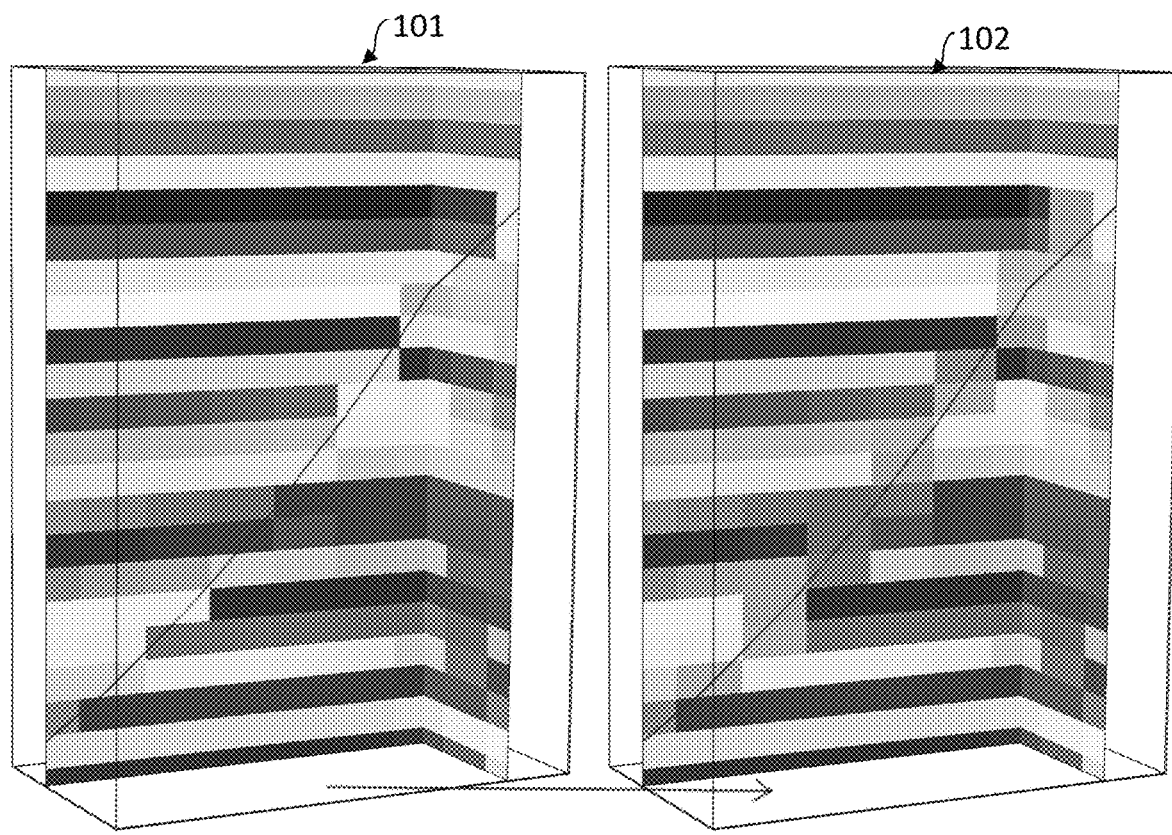
FIG. 10 schematically illustrates a post-processing stage used to alter a child training image, e.g., by blurring fault lines, according to some embodiments of the invention. In the initial child training image, discontinuities in reflectors induced by a fault from a structural model may be very sharp and thus unrealistic. Applying a blurring filter e.g., using a Gaussian convolution kernel, to the faulted location received from the structural model may smooth the synthetic child image around the fault, thus making it more realistic and more suitable to train an artificial intelligence or other data driven model, such as a neural network, in identifying faults in real seismic images.

Reference is made to FIG. 10, which schematically illustrates a post-processing stage used to alter a child training image, according to some embodiments of the invention. In a child training image 101, the discontinuity in the reflectors induced by the fault is too sharp and unrealistic. Embodiments of the invention may generate an altered child training image 102 by applying a post-processing (e.g., Gaussian blur) filter to all pixels in image 101 containing the fault to reduce the gradient along the discontinuity and more closely resemble a smooth transition observed in real, faulted seismic images.

Workflow

Figure 11:
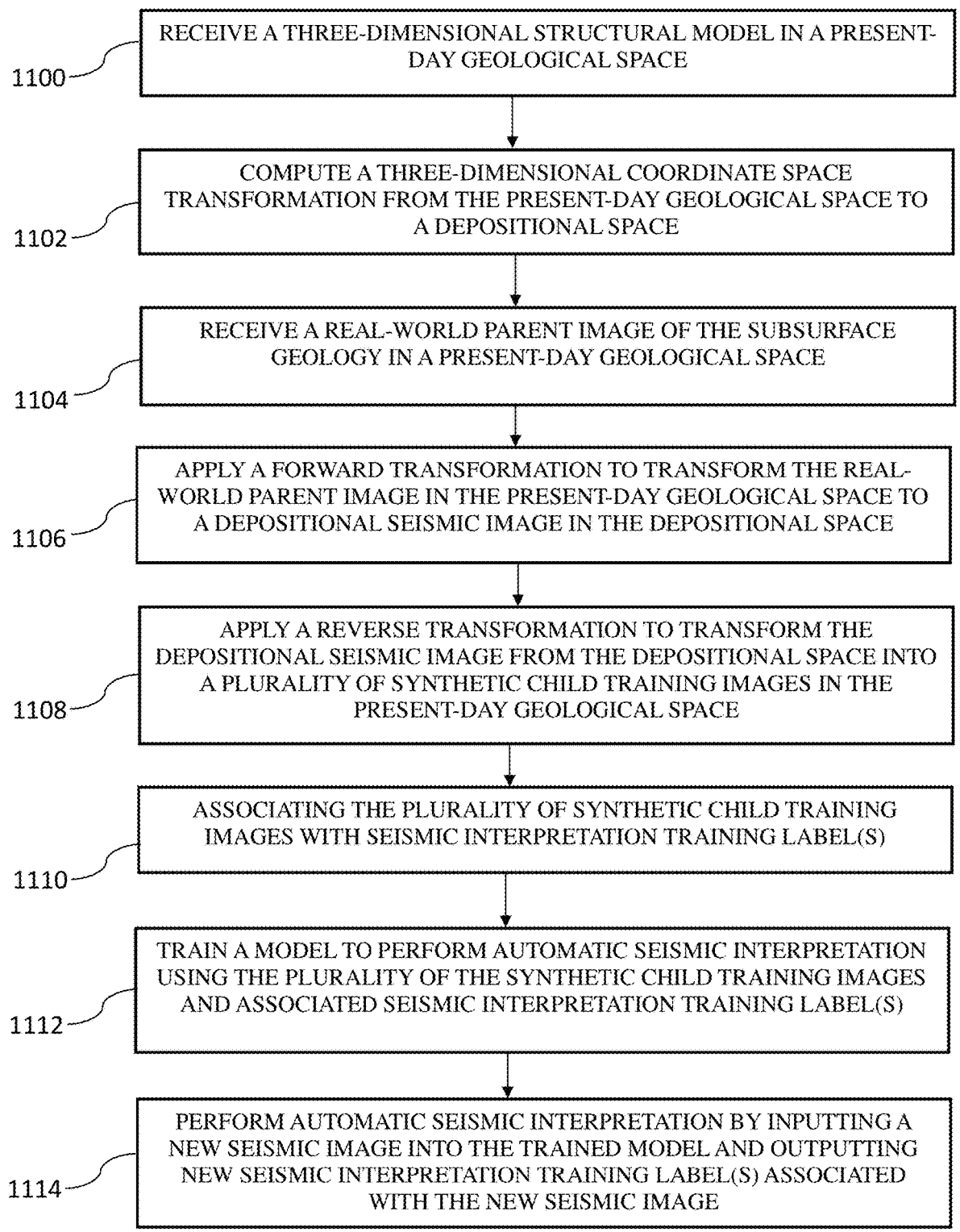
FIG. 11 is a flowchart of a method for converting a real-world parent seismic image into a synthetic child seismic image, according to some embodiments of the invention.

Reference is made to FIG. 11, which is a flowchart of a method for automatically generating seismic training images and associated seismic interpretation training labels to train a model for automatic seismic interpretation, according to some embodiments of the invention. The method may convert a real-world parent seismic image into a plurality of synthetic child seismic images. The automatic seismic interpretation model may be any artificial intelligence or data driven model, such as, a neural network, k-nearest neighbor model, regression model, similarity learning model and Support Vector Machines (SVM).

Figure 12:
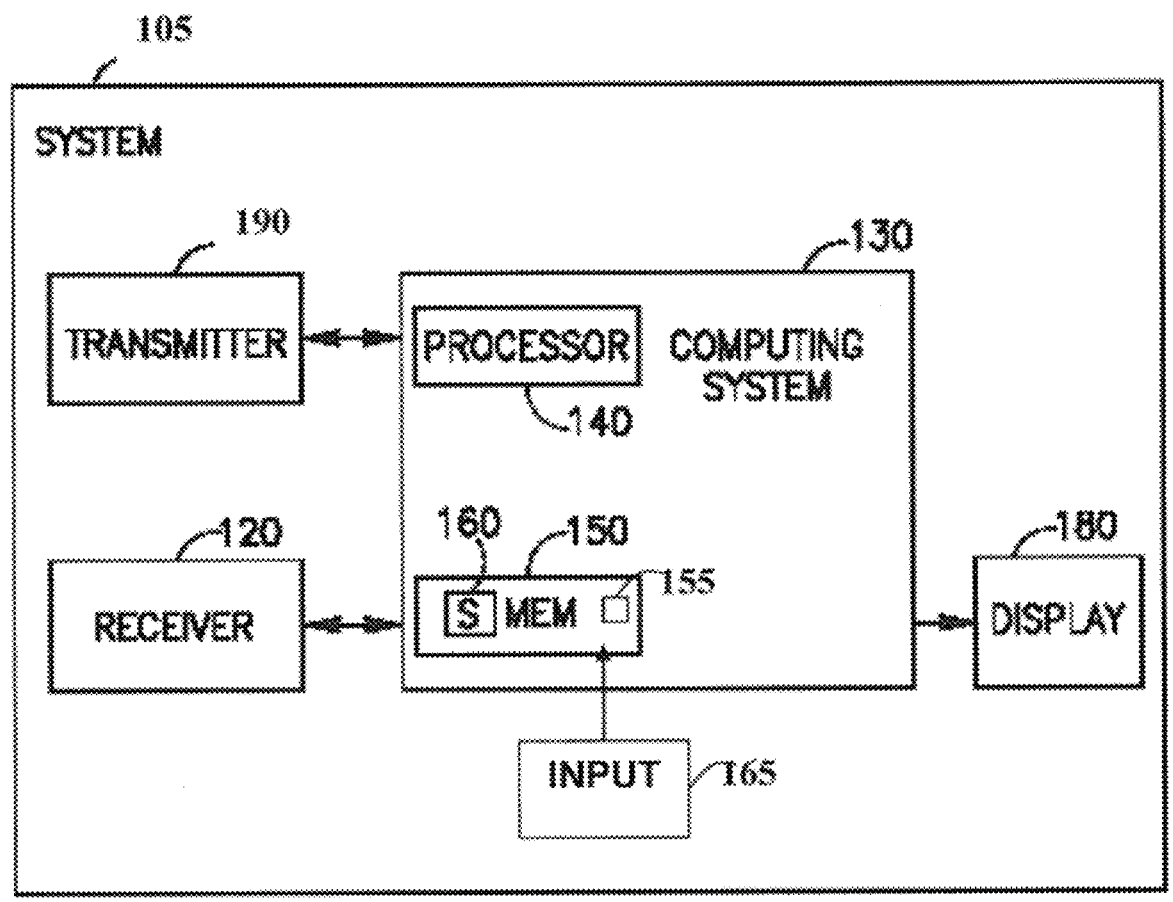
FIG. 12 schematically illustrates a system for converting a real-world parent seismic image into a synthetic child seismic image, according to some embodiments of the invention.

The operation(s) of FIG. 11 may be executed using devices or components of the system disclosed in reference to FIG. 12. For example, one or more operations of FIG. 11 may be executed by one or more processors (e.g., 140 of FIG. 12) and/or using one or more memories (e.g., 150 of FIG. 12) using data (e.g., 155 of FIG. 12). Other systems, devices and components may also be used.

In operation 1100, one or more processors (e.g., 140 of FIG. 12) may receive a three-dimensional structural model (e.g., 10 of FIG. 1) in a present-day geological space (e.g., $G_B$) depicting locations of particles (e.g., in region B) of the subsurface geology of the Earth as observed at a current time period.

In operation 1102, one or more processors may compute a three-dimensional coordinate space transformation (e.g., $uvt_B$) to transform the three-dimensional structural model (e.g., 10 of FIG. 1) from the present-day geological space (e.g., $G_B$) to a depositional structural model (e.g., 12 of FIG. 1) in associated depositional space (e.g., $G^*_B$) depicting past locations of those same particles (e.g., in the corresponding depositional region B) at times when the particles were determined to be originally deposited within the subsurface geology of the Earth.

In operation 1104, one or more processors may receive a real-world parent image of the subsurface geology (e.g., in region A) in a present-day geological space (e.g., $G_A$) generated based on seismic data captured by sensors (e.g., receiver 120 of FIG. 12) recording seismic waves (e.g., emitted by transmitter 190 of FIG. 12) reflected from the subsurface geology.

In operation 1106, one or more processors may apply a forward transformation to transform the real-world parent image from the present-day geological space (e.g., $G_A$) to a depositional seismic image (e.g., 14 of FIG. 1) in the depositional space of the three-dimensional structural model. When the region B of the 3D structural model is different from the region A of the real-world parent image (e.g., A≠B), but the real-world parent image is mapped to a non-associated depositional space of the 3D structural model (instead of its own associated depositional space $G^*_A$) (e.g., setting $G^*_A$ equivalent to $G^*_B$), the depositional seismic image depicts a hybrid of region A's real-world recorded seismic data and region B's real-world interpreted structural objects (e.g., faults, horizons, unconformities, etc.). This hybrid data is realistic (generated entirely from real-world recorded data), but a synthetic mixture of data (does not exist, present or past, in any one real-world region). In some embodiments, when the real-world parent image is derived from seismic data captured from shallow and substantially unfolded and unfaulted parts of a seismic acquisition survey, the forward transformation may not unfault or unfold the image, whereas when the real-world parent image is derived from seismic data captured from folded and/or faulted parts of a seismic acquisition survey, the forward transformation may unfault and/or unfold the image.

Figure 2:
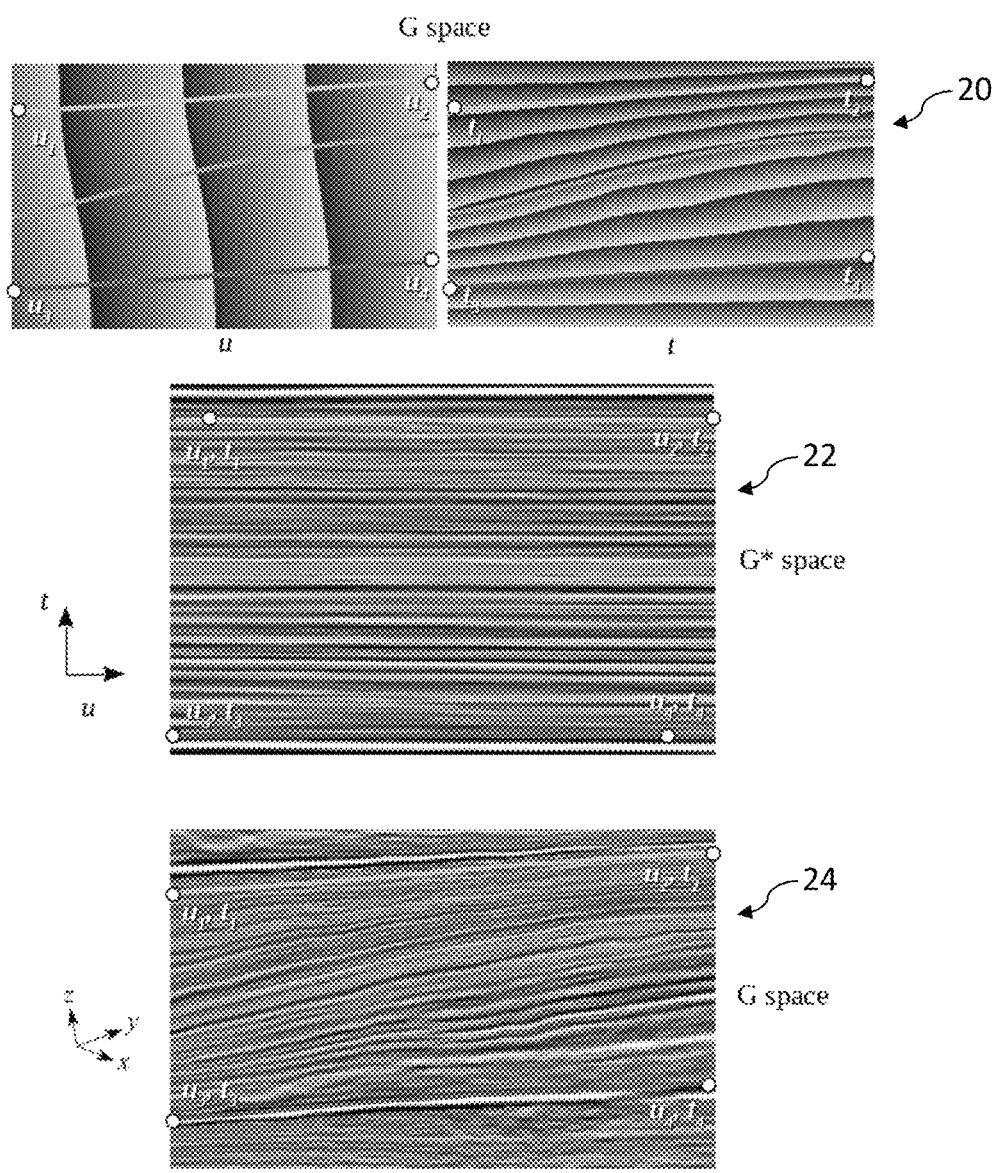
FIG. 2 schematically illustrates transforming a flat seismic image from the depositional space G* to the geological space G according to some embodiments of the invention. In the geological space G, each location in present-day geological space (e.g., x,y,z) may be associated with a location in the depositional space (e.g., u,v,t) via a coordinate transformation. In the depositional space G*, each location (e.g., u,v,t) may be related to a pixel value from the flat seismic image. Mapping (back-projecting) the image from the depositional space G* to the geological space G may comprise, at each location (e.g., x,y,z), looking up the pixel value in the depositional space G* at the matching (e.g., u,v,t) coordinates.

In operation 1108, one or more processors may apply one or more reverse transformations (e.g., $uut_B^{-1}$) to transform the depositional seismic image (e.g., 14 of FIG. 1) from the depositional space (e.g., $G^*_A = G^*_B$) into one or more synthetic child training images (e.g., 16 of FIG. 1) in the present-day geological space (e.g., $G_B$). The real-world parent image and each of the plurality of synthetic child training images (e.g., 16 of FIG. 1) may differ by the addition, deletion, rotation, translation, scaling, location and/or intersection of one or more geological objects in the three-dimensional structural model, or any other geological features. In some embodiments, the one or more processors may apply a plurality of different respective reverse transformations (e.g., $uut_{B1}^{-1}$, $uut_{B2}^{-1}$, ... $uut_{BN}^{-1}$) to generate the plurality of respective synthetic child training images (e.g., 40 of FIG. 4) in a plurality of different respective present-day geological spaces (e.g., $G_{B1}$, $G_{B2}$, ..., $G_{BN}$). The original parent image's geological space (e.g., $G_A$) may be the same as or different from (e.g., equivalent, partially overlapping, entirely non-overlapping) the child synthetic image's geological space (e.g., $G_B$). Additionally or alternatively, the size of the geological spaces of the parent and/or child images may be the same or different and may each be full size (occupying the entire three-dimensional structural model) and/or reduced in size (occupying sub-volumes of the three-dimensional structural model). For example, different training images may occupy different sub-volumes (e.g., as shown in FIG. 4) or the same sub-volume or full size volume (e.g., as shown in FIGS. 1 and 2). In some embodiments where the plurality of synthetic child training images occupy different sub-volumes (e.g., as shown in FIG. 4), those sub-volumes may be distributed at locations in the three-dimensional structural model that are regularly spaced, randomly positioned, and/or preferentially distributed along one or more geologic objects.

In some embodiments, when the real-world parent image received in operation 1104 (e.g., 14 of FIG. 1) is in a first region A that is different than a second region B of the 3D structural model received in operation 1100 (e.g., 10 of FIG. 1) (e.g., A≠B), the forward transformation in operation 1106 transforms the real-world parent image from the first region A of the present-day geological space (e.g., $G_A$) to the depositional seismic image (e.g., 14 of FIG. 1) of a different second non-corresponding region of the three-dimensional structural model (e.g., 10 of FIG. 1) in the depositional space (e.g., $G^*_B$). Each reverse transformation in operation 1108 may then transform the depositional seismic image (e.g., 14 of FIG. 1) from the second region B of the depositional space (e.g., $G^*_B$) to a synthetic child training image (e.g., 16 of FIG. 1) of a second region B of the present-day geological space (e.g., $G_B$) different than the first region of the present-day geological space (e.g., $G_A \neq G_B$). Accordingly, the plurality of different respective reverse transformations may map a single depositional image (e.g., 14 of FIG. 1) to a plurality of synthetic child training images (e.g., 16 of FIG. 1) in different respective regions (e.g., B1, B2, ..., BN) in the present-day geological space depicting a plurality of different respective parts of the subsurface geology (e.g., as shown in FIG. 4). Cross-region transformations between different regions A and B may induce variations between the parent and child images, as well as between the plurality of child images, creating a geologically diverse training image database.

Additionally or alternatively, the one or more processors may generate variations between the parent and child images, as well as between the plurality of child images, by inducing perturbations in the images. Perturbations in the images may be induced by altering the reverse transformation and/or the structural model. In some embodiments, one or more processors may generate the plurality of synthetic child training images by using a plurality of different respective configurations of the three-dimensional structural model in the present-day geological space, using a plurality of different respective configurations of the depositional three-dimensional structural model in the depositional geological space, and/or using a plurality of different reverse transforms. In some embodiments, such perturbations may provide variations between training images (e.g., even when the real-world parent image is in the same region as the 3D structural model (e.g., A=B).

Additionally or alternatively, the one or more processors may alter one or more of the synthetic child training images in a post-processing stage, for example, blurring seismic features along faults and discontinuities as shown in FIG.

10. The same or different alteration(s) may be applied to each distinct synthetic child training image (e.g., 16 of FIG. 1).

In operation 1110, one or more processors may associate the plurality of synthetic child training images (e.g., 16 of FIG. 1) with seismic interpretation training labels. The seismic interpretation training labels may encode the presence or absence of a geological object of interest (e.g., fault, horizon, unconformity, etc.), spatial characteristics of a geological object of interest (e.g., directions, normals, dips, azimuth, etc.), geological-time, or any other modeled property. One or more processors may store, in one or more memories (e.g., 150 of FIG. 12), the plurality of synthetic child training images (e.g., 16 of FIG. 1) and associated seismic interpretation training labels. The one or more processors may automatically generate the seismic interpretation training labels associated with one or more geologic objects from the three-dimensional structural model. In some embodiments, altering the three-dimensional structural model causes the one or more processors to automatically alter one or more seismic interpretation training labels associated with the one or more geologic objects from the three-dimensional structural model. In one example, the one or more processors may alter the seismic interpretation training labels associated with the object's fault type (e.g., from a reverse fault to a normal fault, such as when the fault type changes due to a horizon perturbation). In another example, the one or more processors may alter the seismic interpretation training label associated with the object's geometry type (e.g., directions, normal, azimuth, or other geometric labels). In another example, the one or more processors may alter the seismic interpretation training label associated with geological-time.

In operation 1112, during a training phase, one or more processors may train the model to perform automatic seismic interpretation using the plurality of the synthetic child training images and associated seismic interpretation training labels.

In operation 1114, during a run-time phase, one or more processors may input a new real-world recorded seismic image (e.g., without associated seismic interpretation labels) into the trained model and output one or more new seismic interpretation training labels associated with the new seismic image. The new real-world seismic image may be generated based on seismic data captured by sensors (e.g., receiver 120 of FIG. 12) recording seismic waves (e.g., emitted by transmitter 190 of FIG. 12) reflected from a new region of the subsurface geology.

Other or additional operations may be executed in the same or different order.

System Overview

Reference is made to FIG. 12, which schematically illustrates a system 105 for converting a real-world parent seismic image into a synthetic child seismic image, according to some embodiments of the invention. System 105 may be used to perform the operations of FIG. 11.

System 105 may include one or more transmitter(s) 190, one or more receiver(s) 120, a computing system 130, and a display 180. The aforementioned data, e.g., seismic data used to form intermediate data and finally to model subsurface regions, may be ascertained by processing data generated by transmitter 190 and received by receiver 120. Intermediate data may be stored in memory 150 or other storage units. The aforementioned processes described herein may be performed by software 160 being executed by processor 140 manipulating the data.

Transmitter 190 may transmit signals, for example, acoustic waves, compression waves or other energy rays or waves, that may travel through subsurface (e.g., below land or sea level) structures. The transmitted signals may become incident signals that are incident to subsurface structures. The incident signals may reflect at various transition zones or geological discontinuities throughout the subsurface structures. The reflected signals may include seismic data.

Receiver 120 may accept reflected signal(s) that correspond or relate to incident signals, sent by transmitter 190. Transmitter 190 may transmit output signals. The output of the seismic signals by transmitter 190 may be controlled by a computing system, e.g., computing system 130 or another computing system separate from or internal to transmitter 190. An instruction or command in a computing system may cause transmitter 190 to transmit output signals. The instruction may include directions for signal properties of the transmitted output signals (e.g., such as wavelength and intensity). The instruction to control the output of the seismic signals may be programmed in an external device or program, for example, a computing system, or into transmitter 190 itself.

Computing system 130 may include, for example, any suitable processing system, computing system, computing device, processing device, computer, processor, or the like, and may be implemented using any suitable combination of hardware and/or software. Computing system 130 may include for example one or more processor(s) 140, memory 150 and software 160. Data 155 generated by reflected signals, received by receiver 120, may be transferred, for example, to computing system 130. The data may be stored in the receiver 120 as for example digital information and transferred to computing system 130 by uploading, copying or transmitting the digital information. Processor 140 may communicate with computing system 130 via wired or wireless command and execution signals.

Memory 150 may include cache memory, long term memory such as a hard drive, and/or external memory, for example, including random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Memory 150 may store instructions (e.g., software 160) and data 155 to execute embodiments of the aforementioned methods, steps and functionality (e.g., in long term memory, such as a hard drive). Data 155 may include, for example, raw seismic data collected by receiver 120, real-world seismic images composed from that raw seismic data, a plurality of synthetic training images (and/or instructions for generating the training images) from each real-world seismic image, structural model(s) in the present day and/or depositional space, forward and/or reverse coordinate transforms between the present day and depositional space, instructions for mapping or partitioning a full-size image into a plurality of sub-volumes in or between the present day and/or depositional space, instructions for perturbing coordinate transforms and/or structural models to add, delete, rotate, translate, or scale one or more geological objects, or other instructions or data, instructions for training automatic seismic interpretation models in a training phase using a plurality of synthetic training images, instructions for running automatic seismic interpretation models in a run-time phase to perform automated seismic interpretation for new real seismic images.

Data 155 may also include intermediate data generated by these processes and data to be visualized, such as data representing graphical models to be displayed to a user. System 130 may include cache memory which may include data duplicating original values stored elsewhere or computed earlier, where the original data may be relatively more expensive to fetch (e.g., due to longer access time) or to compute, compared to the cost of reading the cache memory. Cache memory may include pages, memory lines, or other suitable structures. Additional or other suitable memory may be used.

Computing system 130 may include a computing module having machine-executable instructions. The instructions may include, for example, a data processing mechanism (including, for example, embodiments of methods described herein) and a modeling mechanism. These instructions may be used to cause processor 140 using associated software 160 modules programmed with the instructions to perform the operations described. Alternatively, the operations may be performed by specific hardware that may contain hardwired logic for performing the operations, or by any combination of programmed computer components and custom hardware components.

Embodiments of the invention may include an article such as a non-transitory computer or processor readable medium, or a computer or processor storage medium (e.g., memory 150 of FIG. 12), such as for example a memory, a disk drive, or a USB flash memory, encoding, including or storing instructions, e.g., computer-executable instructions, which when executed by a processor or controller (e.g., processor 140 of FIG. 12), carry out methods disclosed herein.

Display 180 may display data from transmitter 190, receiver 120, or computing system 130 or any other suitable systems, devices, or programs, for example, an imaging program or a transmitter or receiver tracking device. Display 180 may include one or more inputs or outputs for displaying data from multiple data sources or to multiple displays. For example, display 180 may display visualizations of subsurface models including subsurface features, such as faults, horizons and unconformities, as a present-day subsurface image and/or a depositional model.

Input device(s) 165 may include a keyboard, pointing device (e.g., mouse, trackball, pen, touch screen), or cursor direction keys, for communicating information and command selections to processor 140. Input device 165 may communicate user direction information and command selections to the processor 140. For example, a user may use input device 165 to select one or more parent or seed images to proliferate into a training dataset, perturbation types (e.g., to edit, add, delete or rescale subsurface structures).

Processor 140 may include, for example, one or more processors, controllers or central processing units ("CPUs"). Software 160 may be stored, for example, in memory 150. Software 160 may include any suitable software. Processor 140 may, input a real-world input parent image, and output a plurality of synthetic child training seismic images and associated seismic interpretation training labels for training an automatic seismic interpretation model, such as a neural network, for example, using data 155 from memory 150.

The system of FIG. 12 may accept the data used to perform the operations of FIG. 11 as for example a set of measured seismic data generated by a seismic survey performing tomographic scanning of a subsurface geological region of the Earth. The computing system may accept one or more of seismic, well or other data. The computing device may generate one or more of seismic, well or other data.

"Time" including the present-day, current or present time, and/or the depositional time t, may refer to geological time periods that span a duration of time, such as, periods of thousands or millions of years. In some embodiments, time periods may be delineated by geological events (e.g., the depositing of a geological layer), rather than strict chronological time.

"Geological-time" t(r) may refer to the time of deposition when a particle of sediment represented by point r was originally deposited in the Earth. In some embodiments, the geological-time of the deposition may be replaced, e.g., by any arbitrary monotonic increasing function of the actual geological-time. It is a convention to use a monotonically increasing function, but similarly an arbitrary monotonic decreasing function may be used. The monotonic function may be referred to as the "pseudo-geological-time".

The geological-time of the deposition of particles may be predicted approximate positions since past configurations cannot typically be verified.

"Current" or "present day" location for a particle (or data structure representing one or more particles) or subsurface feature may refer to the location of the item in the present time, as it is measured or observed in the real world.

In the foregoing description, various aspects of the present invention have been described. For purposes of explanation, specific configurations and details have been set forth in order to provide a thorough understanding of the present invention. However, it will also be apparent to one skilled in the art that the present invention may be practiced without the specific details presented herein. Furthermore, well known features may have been omitted or simplified in order not to obscure the present invention. Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention may manipulate data representations of real-world objects and entities such as underground geological features, including faults and other features. The data may be generated by tomographic scanning, e.g., received by for example a receiver (e.g., receiver 120 of FIG. 12) receiving waves generated by a transmitter (e.g., transmitter 190 of FIG. 12), such as an air gun or explosives, that may be manipulated and stored in memory (e.g., memory 150 of FIG. 12), and data such as images representing underground features may be presented to a user, e.g., as a visualization on a display (e.g., display 180 of FIG. 12).

When used herein, a subsurface image or model may refer to a computer-representation or visualization of actual geological features such as horizons and faults that exist in the real world. Some features when represented in a computing device may be approximations or estimates of a real world feature, or a virtual or idealized feature, such as an idealized horizon as produced by a level-set of a geological time function. A model, or a model representing subsurface features or the location of those features, is typically an estimate or a "model", which may approximate or estimate the physical subsurface structure being modeled with more or less accuracy.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A system for automatically generating seismic training images and associated seismic interpretation training labels to train a model for automatic seismic interpretation, the system comprising:
one or more processors configured to:
receive a three-dimensional structural model in a present-day geological space depicting locations of particles of the subsurface geology of the Earth as observed at a current time period,
compute a three-dimensional coordinate space transformation to transform the three-dimensional structural model from the present-day geological space to a depositional space depicting past locations of the particles at times when the particles were determined to be originally deposited within the subsurface geology of the Earth,
receive a real-world parent image of the subsurface geology in a present-day geological space generated based on seismic data captured by sensors recording seismic waves reflected from the subsurface geology,
apply a forward transformation to transform the real-world parent image in the present-day geological space to a depositional seismic image in the depositional space of the three-dimensional structural model,
apply a reverse transformation to transform the depositional seismic image from the depositional space into a plurality of synthetic child training images in the present-day geological space,
associating the plurality of synthetic child training images with seismic interpretation training labels; and
one or more memories configured to store the plurality of synthetic child training images and associated seismic interpretation training labels.

2. The system of claim 1, wherein the real-world parent image and each of the plurality of synthetic child training images differ by the addition, deletion, rotation, translation, scaling, location or intersection of one or more geological objects.

3. The system of claim 1, wherein the one or more processors are configured to generate the plurality of synthetic child training images by applying a plurality of different respective reverse transformations.

4. The system of claim 3, wherein the one or more processors are configured to apply the plurality of different respective reverse transformations to transform the depositional seismic image to a plurality of different respective regions of the subsurface geology in the present-day geological space.

5. The system of claim 1, wherein the real-world parent image and the three-dimensional structural model depict different regions of the subsurface geology, such that the forward and reverse transforms map the real-world parent image depicting a first region of the subsurface geology to the plurality of the synthetic child training images representing one or more different regions of the subsurface geology.

6. The system of claim 1, wherein the one or more processors are configured to generate the plurality of synthetic child training images by using a plurality of different respective configurations of the three-dimensional structural model in the present-day geological space.

7. The system of claim 1, wherein the one or more processors are configured to generate the plurality of synthetic child training images by using a plurality of different respective configurations of the three-dimensional structural model in the depositional space.

8. The system of claim 1, wherein the real-world parent image and the three-dimensional structural model depict the same region of the subsurface geology, wherein the plurality of the synthetic child training images represent a plurality of different perturbations induced in the present-day or depositional space.

9. The system of claim 1, wherein the one or more processors are configured to alter one or more of the synthetic child training images in a post-processing stage.

10. The system of claim 1, wherein the one or more processors are configured to convert:
a full-size real-world parent image occupying the entire three-dimensional structural model to a plurality of sub-volume synthetic child training images occupying a plurality of respective sub-volumes of the three-dimensional structural model,
a full-size real-world parent image to a plurality of full-size synthetic child training images each occupying the entire three-dimensional structural model, or
a sub-volume real-world parent image occupying a sub-volume of the three-dimensional structural model to the plurality of sub-volume synthetic child training images.

11. The system of claim 10, wherein the plurality of sub-volume synthetic child training images are distributed at locations in the three-dimensional structural model that are regularly spaced, randomly positioned, or preferentially distributed along one or more geologic objects.

12. The system of claim 1, wherein the one or more processors are configured to automatically generate the seismic interpretation training labels associated with one or more geologic objects from the three-dimensional structural model.

13. The system of claim 1, wherein one or more of the seismic interpretation training labels encode information selected from the group consisting of: the presence or absence of a geological object of interest, spatial characteristics of a geological object of interest, and geological-time.

14. The system of claim 1, wherein, during a training phase, the one or more processors are configured to train the model to perform automatic seismic interpretation using the plurality of the synthetic child training images and associated seismic interpretation training labels.

15. The system of claim 14, wherein, during a run-time phase, the one or more processors are configured to input a new seismic image into the trained model and output one or more new seismic interpretation training labels associated with the new seismic image.

16. The system of claim 1, wherein the real-world parent image is derived from seismic data captured from shallow and substantially unfolded and unfaulted parts of a seismic acquisition survey.

17. The system of claim 1, wherein the real-world parent image is derived from seismic data captured from folded and faulted parts of a seismic acquisition survey.

18. A method for automatically generating seismic training images and associated seismic interpretation training labels to train a model for automatic seismic interpretation, the method comprising:
receiving a three-dimensional structural model in a present-day geological space depicting locations of particles of the subsurface geology of the Earth as observed at a current time period;
computing a three-dimensional coordinate space transformation to transform the three-dimensional structural model from the present-day geological space to a depositional space depicting past locations of the particles at times when the particles were determined to be originally deposited within the subsurface geology of the Earth;
receiving a real-world parent image of the subsurface geology in a present-day geological space generated based on seismic data captured by sensors recording seismic waves reflected from the subsurface geology;
applying a forward transformation to transform the real-world parent image in the present-day geological space to a depositional seismic image in the depositional space of the three-dimensional structural model;
applying a reverse transformation to transform the depositional seismic image from the depositional space into a plurality of synthetic child training images in the present-day geological space;
associating the plurality of synthetic child training images with seismic interpretation training labels; and
storing the plurality of synthetic child training images and associated seismic interpretation training labels.

19. The method of claim 18, wherein the real-world parent image and each of the plurality of synthetic child training images differ by the addition, deletion, rotation, translation, scaling, location or intersection of one or more geological objects.

20. The method of claim 18 comprising generating the plurality of synthetic child training images by applying a plurality of different respective reverse transformations.

21. The method of claim 20, wherein applying the plurality of different respective reverse transformations comprises transforming the depositional seismic image to a plurality of different respective regions in the present-day geological space depicting a plurality of different respective parts of the subsurface geology.

22. The method of claim 18, wherein the real-world parent image and the three-dimensional structural model depict different regions of the subsurface geology, such that the forward and reverse transforms map the real-world parent image depicting a first region of the subsurface geology to the plurality of the synthetic child training images representing one or more different regions of the subsurface geology.

23. The method of claim 18 comprising generating the plurality of synthetic child training images by using a plurality of different respective configurations of the three-dimensional structural model in the present-day geological space.

24. The method of claim 18 comprising generating the plurality of synthetic child training images by using a plurality of different respective configurations of the three-dimensional structural model in the depositional space.

25. The method of claim 18, wherein the real-world parent image and the three-dimensional structural model depict the same region of the subsurface geology, comprising inducing a plurality of different perturbations in the present-day or depositional space to generate respective variations in the plurality of the synthetic child training images.

26. The method of claim 18 comprising converting:
a full-size real-world parent image occupying the entire three-dimensional structural model to a plurality of sub-volume synthetic child training images occupying a plurality of respective sub-volumes of the three-dimensional structural model,
a full-size real-world parent image to a plurality of full-size synthetic child training images each occupying the entire three-dimensional structural model, or
a sub-volume real-world parent image occupying a sub-volume of the three-dimensional structural model to the plurality of sub-volume synthetic child training images.

27. The method of claim 18 comprising, during a training phase, training the model to perform automatic seismic interpretation using the plurality of the synthetic child training images and associated seismic interpretation training labels.

28. The method of claim 18 comprising, during a run-time phase:
inputting a new seismic image into the trained model; and
outputting one or more new seismic interpretation training labels associated with the new seismic image.

29. A non-transitory computer readable storage medium having instructions stored thereon which, when executed by one or more processors, causes the processors to:
receive a three-dimensional structural model in a present-day geological space depicting locations of particles of the subsurface geology of the Earth as observed at a current time period;
compute a three-dimensional coordinate space transformation to transform the three-dimensional structural model from the present-day geological space to a depositional space depicting past locations of the particles at times when the particles were determined to be originally deposited within the subsurface geology of the Earth;
receive a real-world parent image of the subsurface geology in a present-day geological space generated based on seismic data captured by sensors recording seismic waves reflected from the subsurface geology;
apply a forward transformation to transform the real-world parent image in the present-day geological space to a depositional seismic image in the depositional space of the three-dimensional structural model;
apply a reverse transformation to transform the depositional seismic image from the depositional space into a plurality of synthetic child training images in the present-day geological space;
associate the plurality of synthetic child training images with seismic interpretation training labels; and
store the plurality of synthetic child training images and associated seismic interpretation training labels.

30. The non-transitory computer readable storage medium of claim 29, further storing instructions which, when executed by the one or more processors, causes the processors to:
execute a training phase comprising training the model to perform automatic seismic interpretation using the plurality of the synthetic child training images and associated seismic interpretation training labels; and execute a run-time phase comprising inputting a new seismic image into the trained model, and outputting one or more new seismic interpretation training labels associated with the new seismic image.

* * * * *